United States Patent
O'Sullivan

(10) Patent No.: US 11,263,904 B2
(45) Date of Patent: *Mar. 1, 2022

(54) SYSTEMS AND METHODS FOR VERIFYING HIGH-OCCUPANCY VEHICLE JOURNEYS AND DETERMINING PREFERENTIAL ROAD ALLOWANCES

(71) Applicant: CARMA TECHNOLOGY LIMITED, Cork (IE)

(72) Inventor: Sean O'Sullivan, Princeton, NJ (US)

(73) Assignee: Carma Technology Limited, Cork (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,092

(22) Filed: Mar. 1, 2019

(65) Prior Publication Data
US 2019/0197895 A1  Jun. 27, 2019

Related U.S. Application Data

(60) Continuation of application No. 15/998,864, filed on Aug. 17, 2018, which is a continuation of application
(Continued)

(51) Int. Cl.
*G06Q 50/30* (2012.01)
*G08G 1/123* (2006.01)
(Continued)

(52) U.S. Cl.
CPC .............. *G08G 1/123* (2013.01); *G06Q 10/00* (2013.01); *G06Q 10/02* (2013.01); *G06Q 10/025* (2013.01);
(Continued)

(58) Field of Classification Search
CPC ........ G08G 1/123; G06Q 10/00; G06Q 10/02; G06Q 50/30; G06Q 10/025
See application file for complete search history.

(56) References Cited

U.S. PATENT DOCUMENTS 4,360,875 A   11/1982   Behnke
5,799,263 A    8/1998   Culbertson
(Continued)

FOREIGN PATENT DOCUMENTS

CA    1186056 A      4/1985
DE   10113803 A1    9/2002
(Continued)

OTHER PUBLICATIONS

Tao, "Dynamic Taxi-sharing Service Using Intelligent Transportation System Technologies", IEEE, 2007, pp. 3209-3212 (Year: 2007).*
(Continued)

*Primary Examiner* — Rupangini Singh
(74) *Attorney, Agent, or Firm* — Bookoff McAndrews, PLLC

(57) ABSTRACT

The network system triggers registration of the start of a transport journey in response to a communication of a transport user device and a transport provider device with each other, performs a continuous coordinated proximity monitoring to verify the identity of a transport user and a transport provider vehicle, and triggers registration of the end of the transport journey through communication of the transport user device and the transport provider device with each other.

16 Claims, 32 Drawing Sheets

Related U.S. Application Data

No. 12/924,487, filed on Sep. 28, 2010, now Pat. No. 10,083,608, which is a division of application No. 12/069,656, filed on Feb. 12, 2008, now Pat. No. 7,840,427.

(60) Provisional application No. 60/900,808, filed on Feb. 12, 2007.

(51) Int. Cl.
  *G06Q 10/00* (2012.01)
  *G06Q 10/02* (2012.01)
  *G06Q 10/06* (2012.01)

(52) U.S. Cl.
  CPC ..... *G06Q 10/063112* (2013.01); *G06Q 50/30* (2013.01)

(56) References Cited

U.S. PATENT DOCUMENTS

| | | | |
|---|---|---|---|
| 6,085,976 A | 7/2000 | Sehr | |
| 6,363,323 B1 | 3/2002 | Jones | |
| 6,434,510 B1 | 8/2002 | Callaghan | |
| 6,675,150 B1 | 1/2004 | Camer | |
| 6,919,804 B1 | 7/2005 | Cook et al. | |
| 6,975,997 B1 | 12/2005 | Murakami et al. | |
| 7,062,376 B2 | 6/2006 | Oesterling | |
| 7,080,019 B1 | 7/2006 | Hurzeler | |
| 7,119,716 B2 | 10/2006 | Horstemeyer | |
| 7,363,319 B2 | 4/2008 | Cappellini | |
| 7,449,998 B1 | 11/2008 | Au et al. | |
| 7,870,025 B2 | 1/2011 | English | |
| 7,877,204 B2 | 1/2011 | Sprigg | |
| 8,682,804 B1 | 3/2014 | Yoon | |
| 9,026,454 B2 | 5/2015 | Hinrichs et al. | |
| 9,892,637 B2 | 2/2018 | Demisse | |
| 9,911,169 B1 | 3/2018 | Geist et al. | |
| 9,978,282 B2 | 5/2018 | Lambert et al. | |
| 9,991,169 B2 | 6/2018 | Van Dal et al. | |
| 10,121,289 B1 | 11/2018 | Gravelle | |
| 10,169,987 B1 | 1/2019 | Demisse | |
| 10,395,525 B1 | 8/2019 | Demisse | |
| 10,559,199 B1 | 2/2020 | Demisse | |
| 10,748,417 B1 | 8/2020 | Demisse | |
| 10,748,420 B1 | 8/2020 | O'Sullivan | |
| 10,803,749 B2 | 10/2020 | O'Sullivan | |
| 2001/0037174 A1 | 11/2001 | Dickerson | |
| 2001/0056363 A1 | 12/2001 | Gantz et al. | |
| 2002/0011940 A1 | 1/2002 | Cappel | |
| 2002/0034292 A1 | 3/2002 | Tuoriniemi et al. | |
| 2002/0040944 A1 | 4/2002 | Takaha et al. | |
| 2002/0046076 A1 | 4/2002 | Baillargeon et al. | |
| 2002/0052751 A1 | 5/2002 | Ebata | |
| 2002/0069017 A1 | 6/2002 | Schmier et al. | |
| 2002/0121962 A1 | 9/2002 | Wolfe | |
| 2002/0127997 A1 | 9/2002 | Karlstedt et al. | |
| 2002/0135515 A1 | 9/2002 | Rankin | |
| 2002/0156572 A1 | 10/2002 | Bullock et al. | |
| 2002/0173978 A1 | 11/2002 | Boies et al. | |
| 2003/0040944 A1 | 2/2003 | Hileman | |
| 2003/0100993 A1 | 5/2003 | Kirshenbaum et al. | |
| 2003/0139941 A1 | 7/2003 | Matsumoto | |
| 2003/0179113 A1 | 9/2003 | Apostolopoulos et al. | |
| 2003/0195694 A1 | 10/2003 | Kozak et al. | |
| 2004/0015475 A1* | 1/2004 | Scheepsma | G07B 15/02 |
| 2004/0049424 A1 | 3/2004 | Murray et al. | |
| 2004/0076280 A1 | 4/2004 | Ando et al. | |
| 2004/0106399 A1 | 6/2004 | Joon-Seong | |
| 2004/0119589 A1 | 6/2004 | French et al. | |
| 2004/0124977 A1 | 7/2004 | Biffar | |
| 2004/0158483 A1 | 8/2004 | Lecouturier | |
| 2004/0181495 A1* | 9/2004 | Grush | G06Q 30/0284 705/417 |
| 2004/0243430 A1 | 12/2004 | Horstemeyer | |
| 2004/0249818 A1 | 12/2004 | Isaac | |
| 2004/0260470 A1 | 12/2004 | Rast | |
| 2004/0267449 A1 | 12/2004 | Adamczyk | |
| 2005/0021227 A1 | 1/2005 | Matsumoto et al. | |
| 2005/0049781 A1 | 3/2005 | Oesterling | |
| 2005/0165762 A1 | 7/2005 | Bishop | |
| 2005/0172148 A1 | 8/2005 | Ying | |
| 2005/0197767 A1 | 9/2005 | Nortrup | |
| 2006/0010037 A1 | 1/2006 | Angert et al. | |
| 2006/0015394 A1 | 1/2006 | Sorensen | |
| 2006/0039577 A1 | 2/2006 | Sanguino et al. | |
| 2006/0059023 A1 | 3/2006 | Mashinsky | |
| 2006/0091206 A1 | 5/2006 | Olsen et al. | |
| 2006/0153099 A1 | 7/2006 | Feldman et al. | |
| 2006/0178949 A1 | 8/2006 | McGrath | |
| 2006/0234631 A1 | 10/2006 | Dieguez | |
| 2006/0259353 A1 | 11/2006 | Gutmann | |
| 2006/0276960 A1 | 12/2006 | Adamczyk et al. | |
| 2007/0013209 A1 | 1/2007 | Neuburger et al. | |
| 2007/0027825 A1 | 2/2007 | Pearce et al. | |
| 2007/0030824 A1 | 2/2007 | Ribaudo et al. | |
| 2007/0052586 A1 | 3/2007 | Horstemeyer | |
| 2007/0135078 A1 | 6/2007 | Ljung | |
| 2007/0143012 A1 | 6/2007 | Keaveny et al. | |
| 2007/0150369 A1 | 6/2007 | Zivin | |
| 2007/0179792 A1 | 8/2007 | Kramer | |
| 2007/0243880 A1 | 10/2007 | Gits et al. | |
| 2007/0276595 A1 | 11/2007 | Lewinson et al. | |
| 2008/0004802 A1 | 1/2008 | Horvitz | |
| 2008/0041936 A1 | 2/2008 | Vawter | |
| 2008/0091342 A1 | 4/2008 | Assael | |
| 2008/0109852 A1 | 5/2008 | Kretz et al. | |
| 2008/0114629 A1 | 5/2008 | Pavlov | |
| 2008/0114829 A1 | 5/2008 | Button et al. | |
| 2008/0125967 A1 | 5/2008 | Sprigg | |
| 2008/0140479 A1 | 6/2008 | Mello et al. | |
| 2008/0167892 A1 | 7/2008 | Clark et al. | |
| 2008/0172173 A1 | 7/2008 | Chang et al. | |
| 2008/0270010 A1 | 10/2008 | Harumoto et al. | |
| 2008/0270019 A1 | 10/2008 | Anderson et al. | |
| 2008/0277183 A1 | 11/2008 | Huang et al. | |
| 2009/0089105 A1 | 4/2009 | Wu | |
| 2009/0119006 A1 | 5/2009 | Silver et al. | |
| 2009/0326991 A1 | 12/2009 | Wei et al. | |
| 2010/0161392 A1* | 6/2010 | Ashby | G06Q 30/02 705/13 |
| 2011/0102165 A1 | 5/2011 | Rahamim | |
| 2011/0145089 A1 | 6/2011 | Khunger et al. | |
| 2011/0153629 A1 | 6/2011 | Lehmann et al. | |
| 2011/0196708 A1 | 8/2011 | Huang et al. | |
| 2012/0130872 A1* | 5/2012 | Baughman | G07B 15/02 705/32 |
| 2013/0185109 A1 | 7/2013 | Loabneh et al. | |
| 2014/0032282 A1 | 1/2014 | Fu | |
| 2015/0206166 A1 | 7/2015 | Fletcher et al. | |
| 2016/0069694 A1 | 3/2016 | Tao et al. | |
| 2017/0011324 A1 | 1/2017 | Truong et al. | |
| 2017/0178416 A1* | 6/2017 | Barreira Avegliano | G07B 15/06 |
| 2018/0211541 A1 | 7/2018 | Rakah et al. | |
| 2018/0338225 A1* | 11/2018 | Shimizu | H04W 4/046 |
| 2019/0050880 A1 | 2/2019 | Paul et al. | |
| 2019/0051174 A1 | 2/2019 | Haque et al. | |
| 2019/0073737 A1 | 3/2019 | Marchio | |
| 2019/0095965 A1 | 3/2019 | Stayner et al. | |
| 2019/0137288 A1 | 5/2019 | Rahematpura et al. | |
| 2019/0205812 A1 | 7/2019 | Afzal et al. | |
| 2020/0410857 A1 | 12/2020 | O'Sullivan | |

FOREIGN PATENT DOCUMENTS

| | | |
|---|---|---|
| DE | 10237831 A1 | 2/2004 |
| EP | 1710768 A2 | 10/2006 |
| JP | 2001291192 A | 10/2001 |
| JP | 2002140399 A | 5/2002 |
| JP | 2002367086 A | 12/2002 |
| JP | 2003036498 A | 2/2003 |
| JP | 2003168195 A | 6/2003 |
| JP | 2003256982 A | 9/2003 |

(56) References Cited

FOREIGN PATENT DOCUMENTS

| JP | 2003331013 A | | 11/2003 | |
|---|---|---|---|---|
| JP | 2005182146 A | | 7/2005 | |
| WO | 9952084 A1 | | 10/1999 | |
| WO | 0161604 A1 | | 8/2001 | |
| WO | 0206994 A2 | | 1/2002 | |
| WO | WO 02073546 A2 | | 9/2002 | |
| WO | WO-02073546 A2 | * | 9/2002 | ............ G07B 15/02 |
| WO | 03023641 A1 | | 3/2003 | |
| WO | 03040971 A1 | | 5/2003 | |
| WO | 2004081833 A1 | | 9/2004 | |
| WO | 2005045549 A2 | | 5/2005 | |
| WO | 2006011158 A2 | | 2/2006 | |
| WO | 2006088703 A2 | | 8/2006 | |

OTHER PUBLICATIONS

Chi-Chung Tao, "Dynamic Taxi-sharing Service Using Intelligent Transportation System Technologies," 2007, IEEE, 007 International Conference on Wireless Communications, Networking and Mobile Computing Wireless Communications, Networking and Mobile Computing, pp. 3209-3212.

Dailey D.J., et al., "Seattle Smart Traveler: Dynamic Ridematching on the World Wide Web," Transportation Reseach Part C 7, Mar. 5, 1999, pp. 1-17.

Dillenburg J.F., et al., "The Intelligent Travel Assistant," Sep. 2-6, 2002, 7 pages.

Hall R.W. and Qureshi A., "Dynamic Ride-Sharing: Theory and Practice," Journal of Transportation Engineering, Jul./Aug. 1997, vol. 123, pp. 308-315.

Hu P.S., "Summary of Travel Trends 1995 National Personal Transportation Survey", prepared for U.S. Department of Transportation, Federal High Administralion, Dec. 1999, 142 pages.

Hwang M., et al., "Advanced Public Transportation Systems: State of the Art Update 2006," Federal Transit Administration, Final report, Report No. FTA-NJ-26-7062-06.1, Mar. 30, 2006, pp. 1-264.

HyreCar, "The 14 Best Apps to track your Uber and Lyft Mileage", Dec. 30, 2017, (https://web.archive.org/web/20171230231230/http://hyrecar.com/blog/best-apps-to-track-uber-and-lyft-mileage/), 22 pages, (Year: 2017).

Miyamoto T., et al., "Agent-Based Planning Method for an On-Demand Transportation System," Proceedings of the 2003 IEEE International Symposium on Intelligent Control, Oct. 5-8, 2003, pp. 620.625.

Roorda M.J., et al., "Past Presidents' Award for Merit in Transportation Engineering: Assessing Transportation Policy Using an Activity-Based Microsimulation Model of Travel Demand", Institute of Transportation Engineers, Nov. 2006, vol. 76 (11), pp. 16-21.

Savelsbergh M.W.P. and Sol M., "The General Pickup and Delivery Problem," Transportation Science, 1995, vol. 29 (1), pp. 17-29.

Steger-Vonmetz D.C., "Improving Modal Choice and Transport Efficiency with the Virtual Ridesharing Agency," Proceedings of the 8th International IEEE Conference on Intelligent Translaporation Systems, Sep. 13-16, 2005, pp. 994-999.

Winter S. and Raubal M., "Time Geography for Ad-Hoc Shared-Ride Trip Planning," 2006, 8 pages.

\* cited by examiner

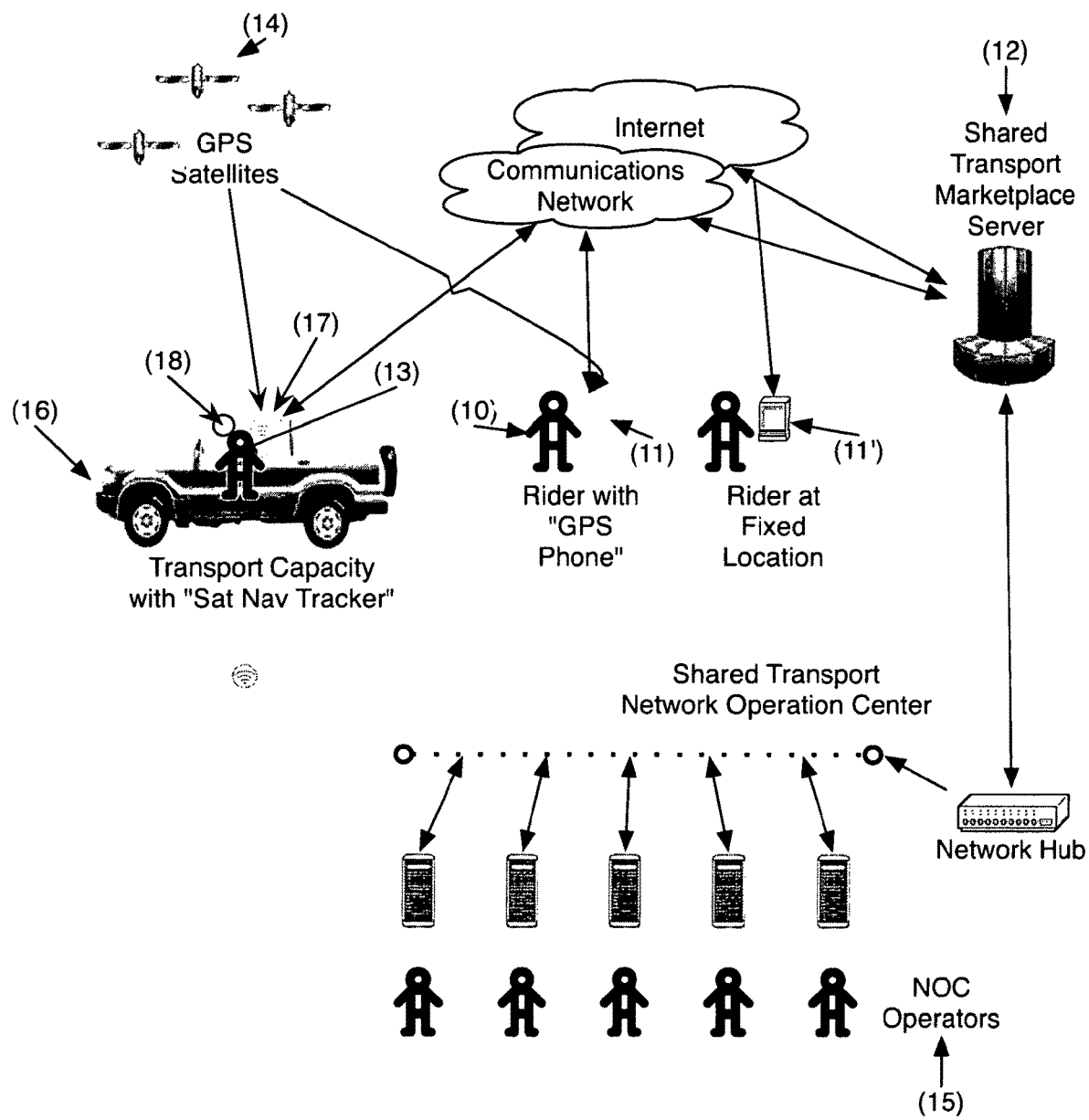
Figure 1. Shared Transport Network System

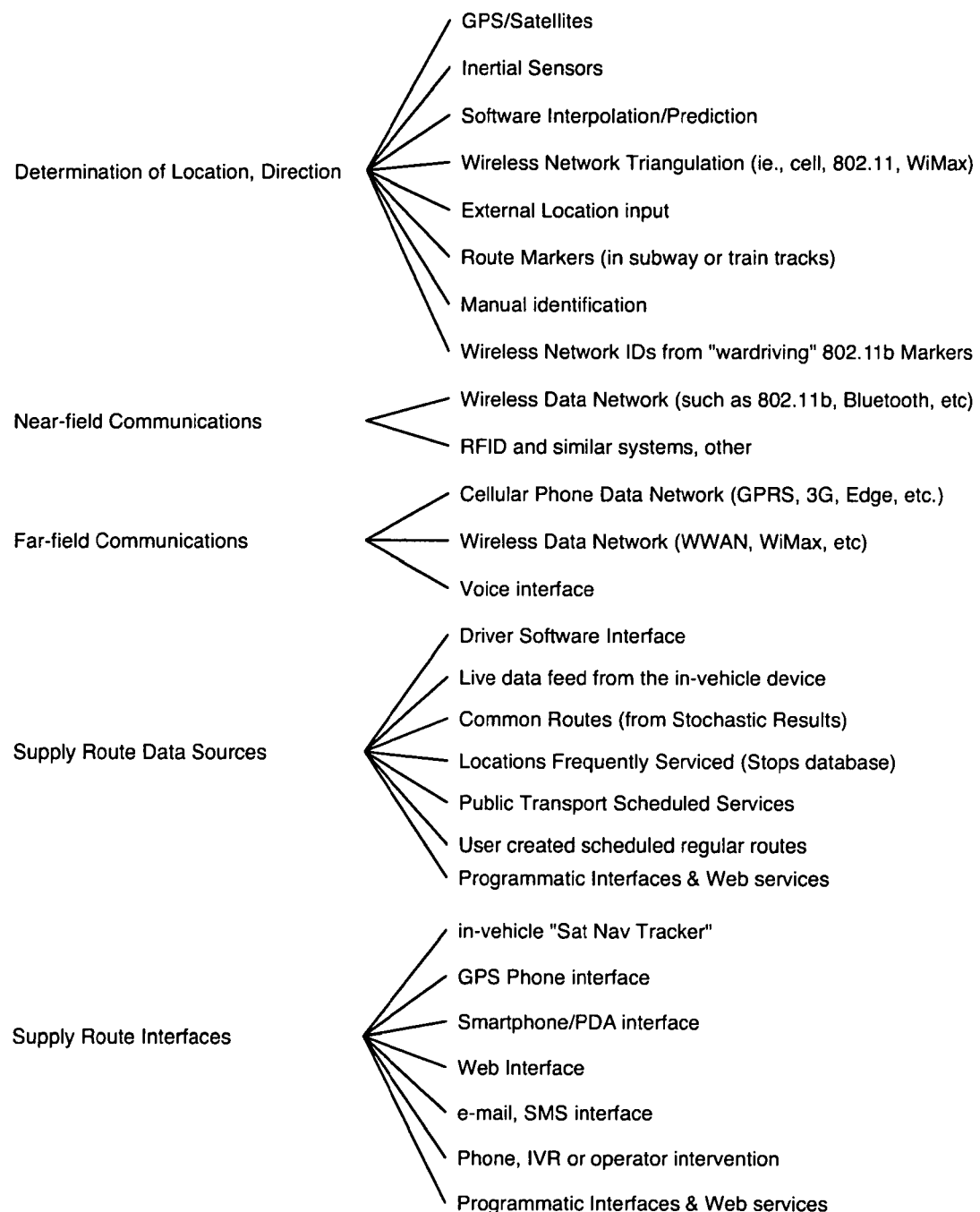
Figure 2. Transport Capacity Computing and Communications Components

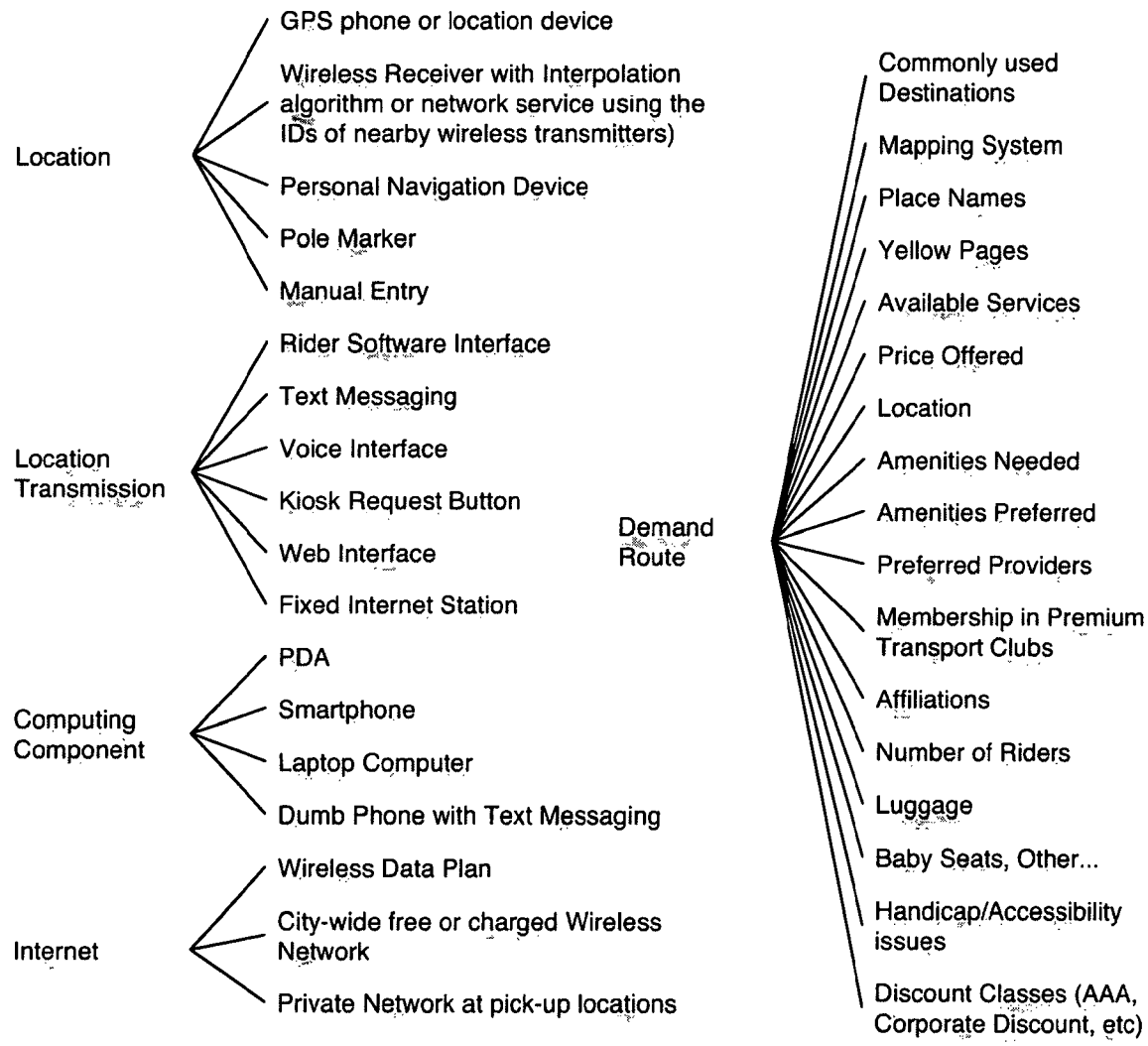
Figure 3. Rider Technology Components and Information Elements

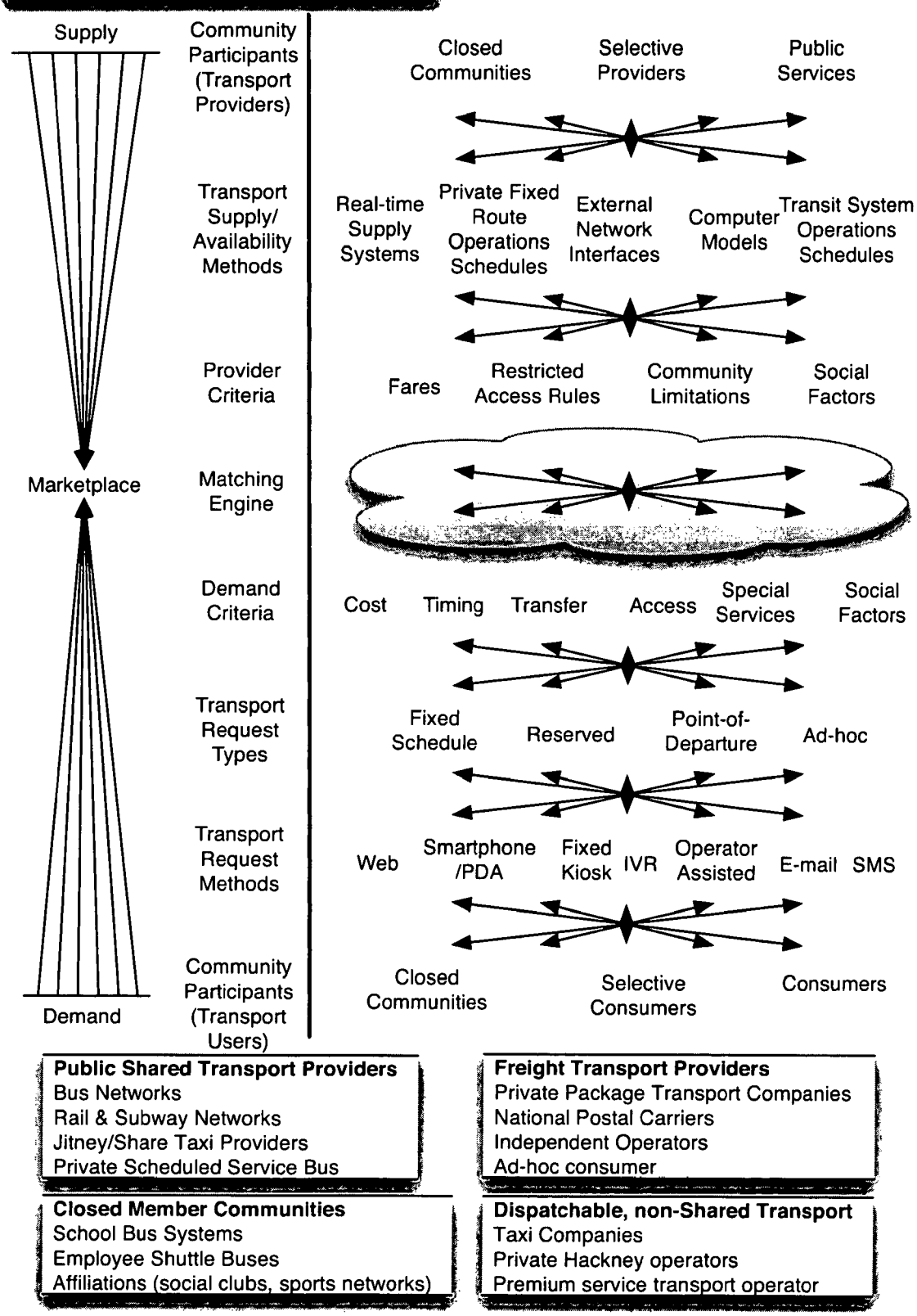

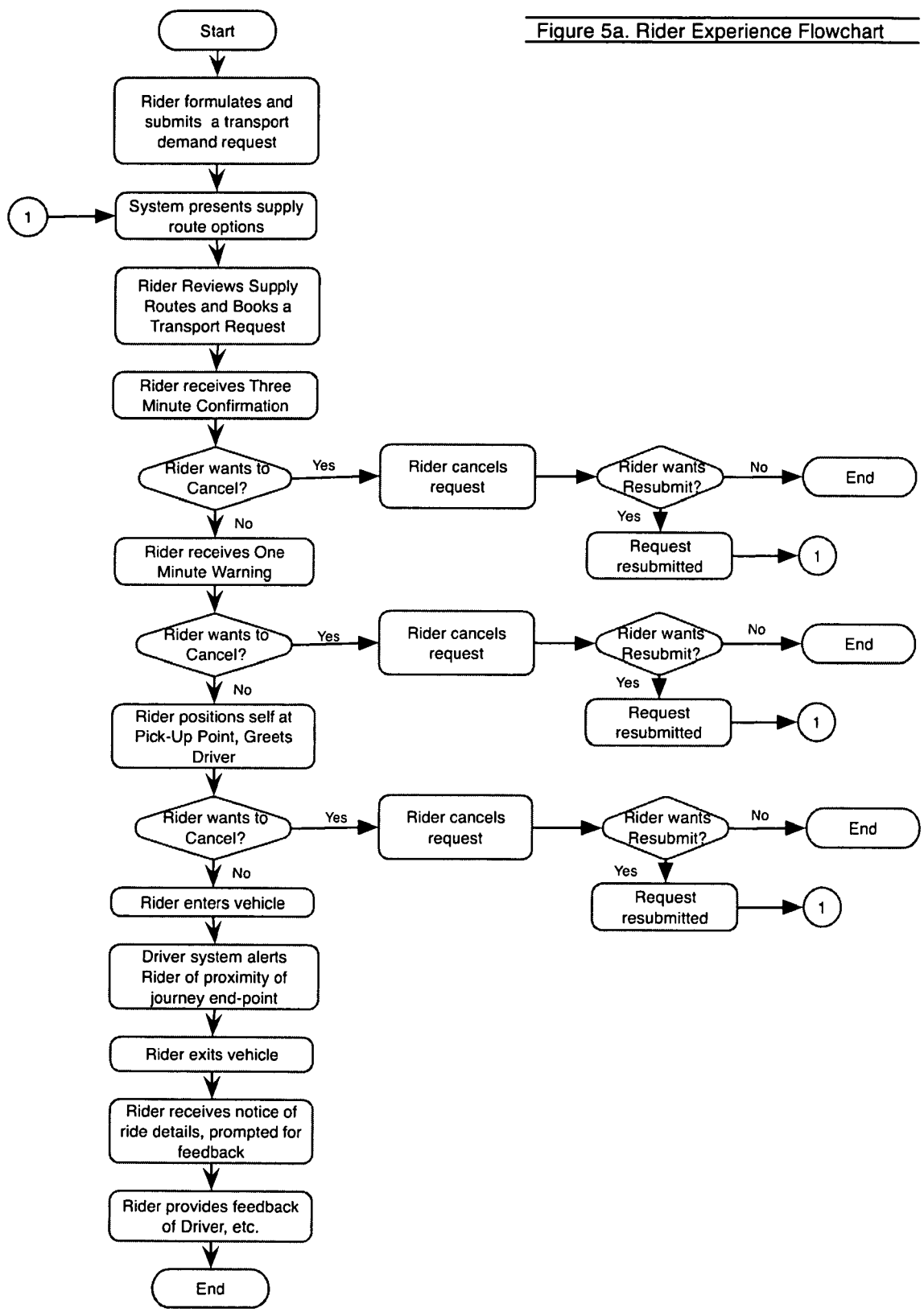
Figure 5a. Rider Experience Flowchart

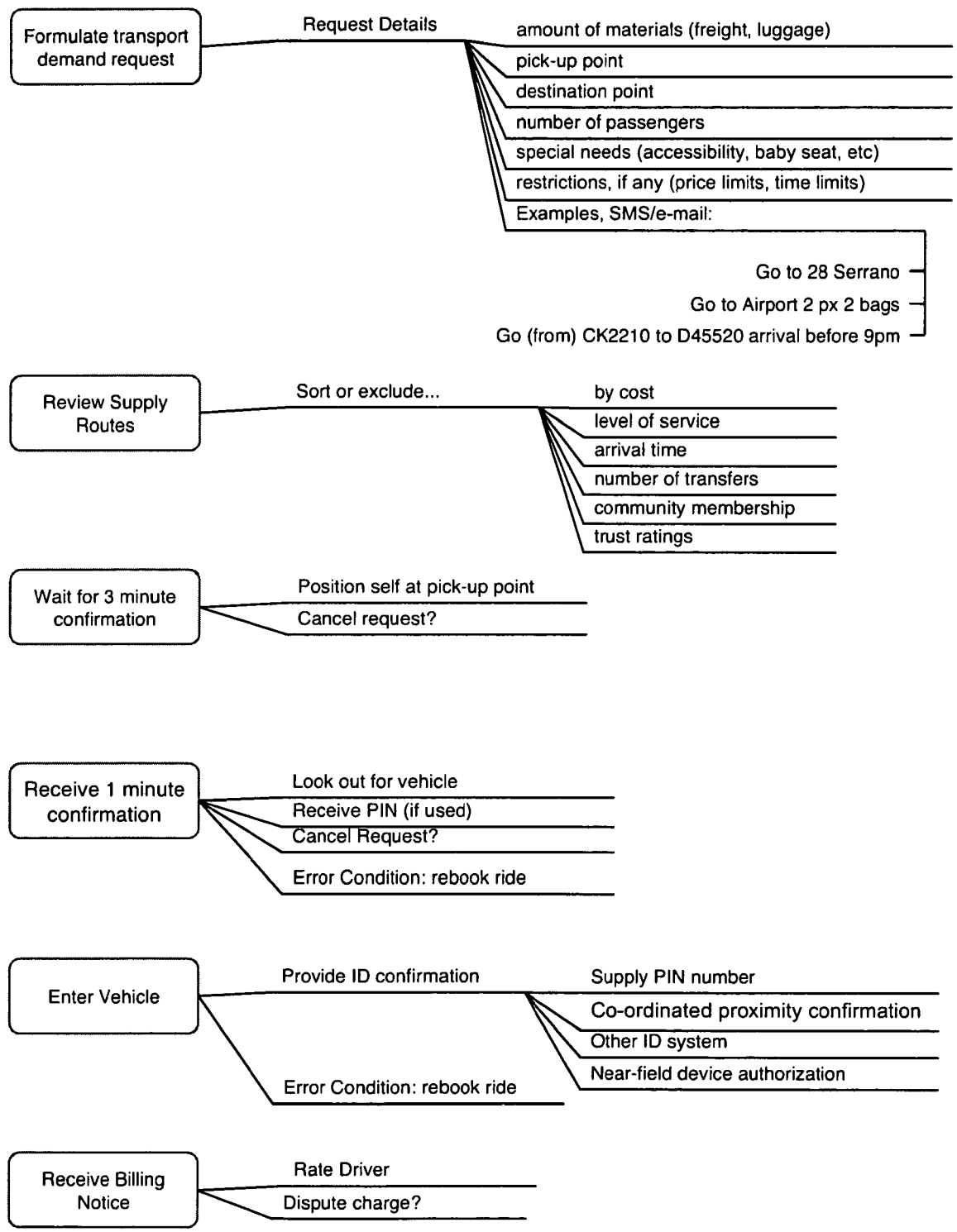
Figure 5b. Rider Experience, Functional Options Data and Action Details

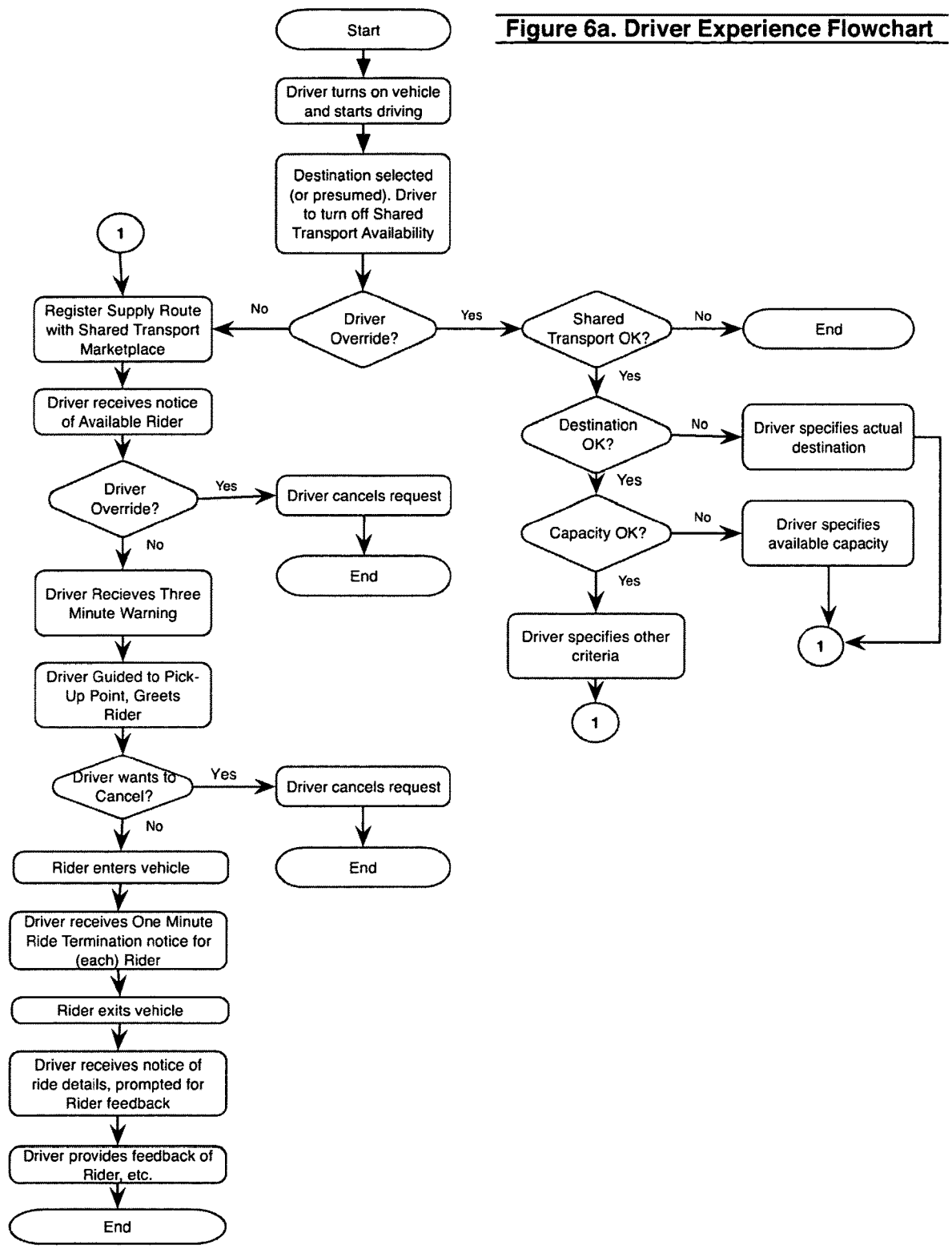
Figure 6a. Driver Experience Flowchart

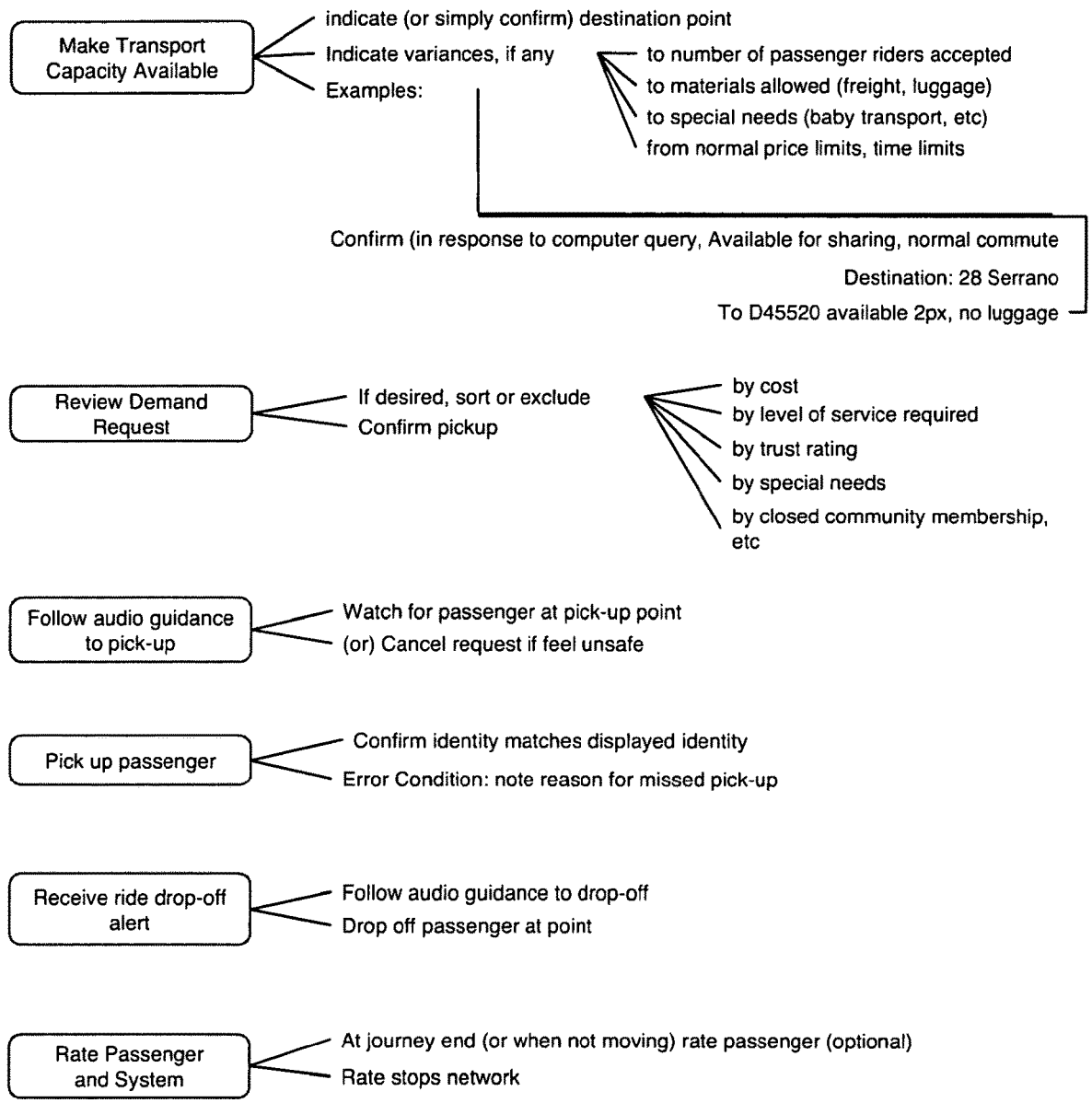
Figure 6b. Driver Experience - Functional Options

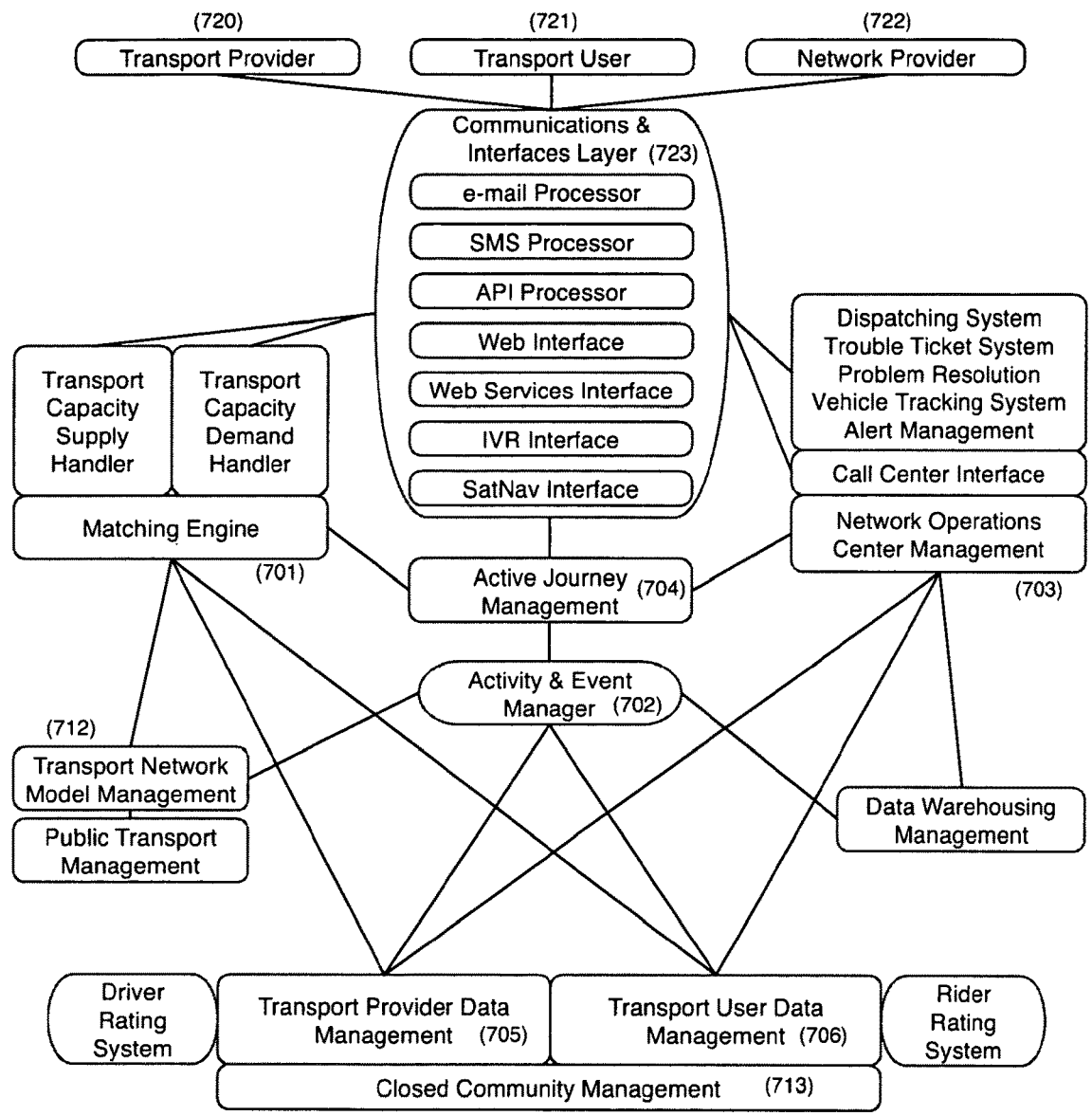
Fig 7. Shared Transport Marketplace Server & Subsystems

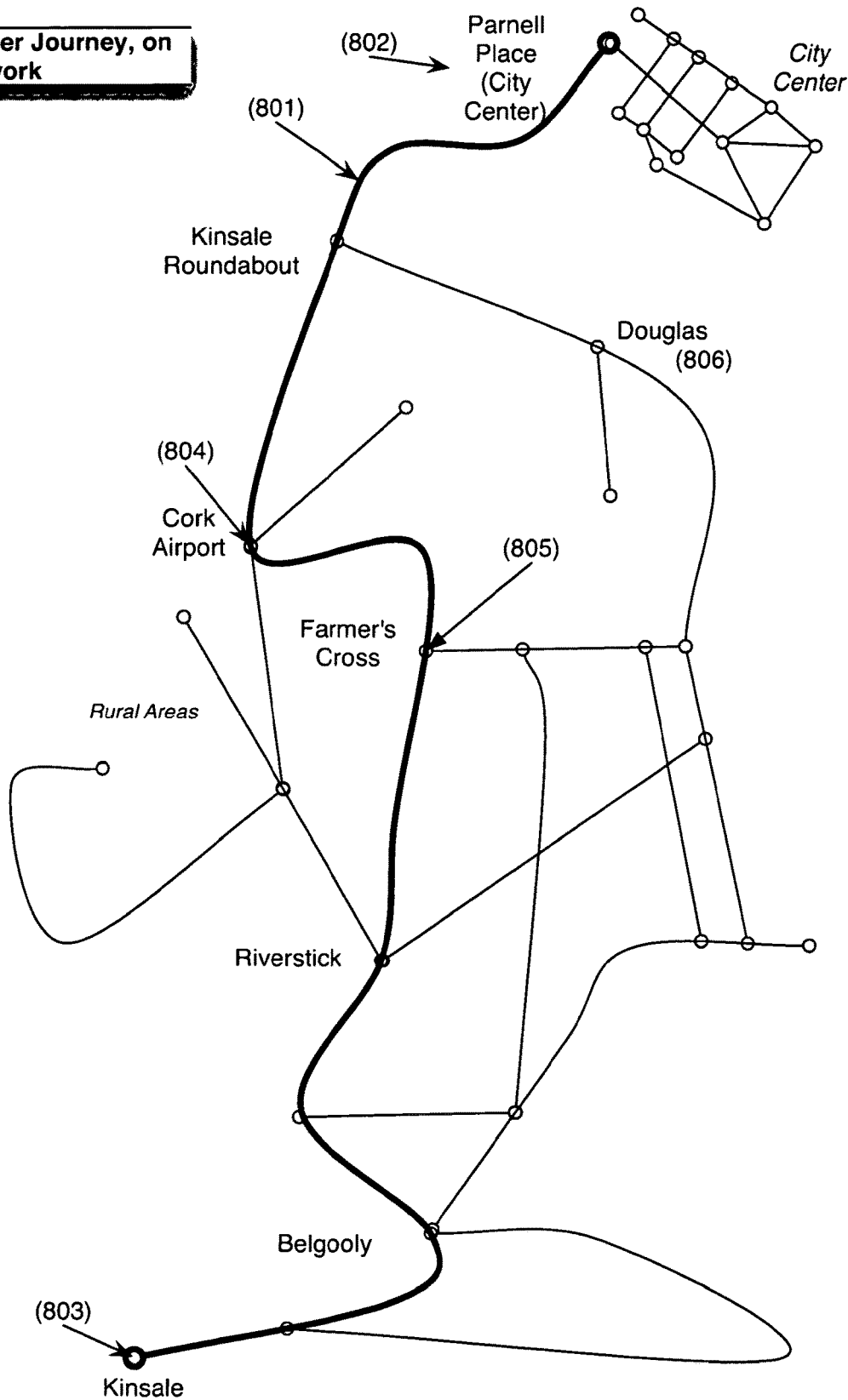
Fig 8a. Driver Journey, on Street Network

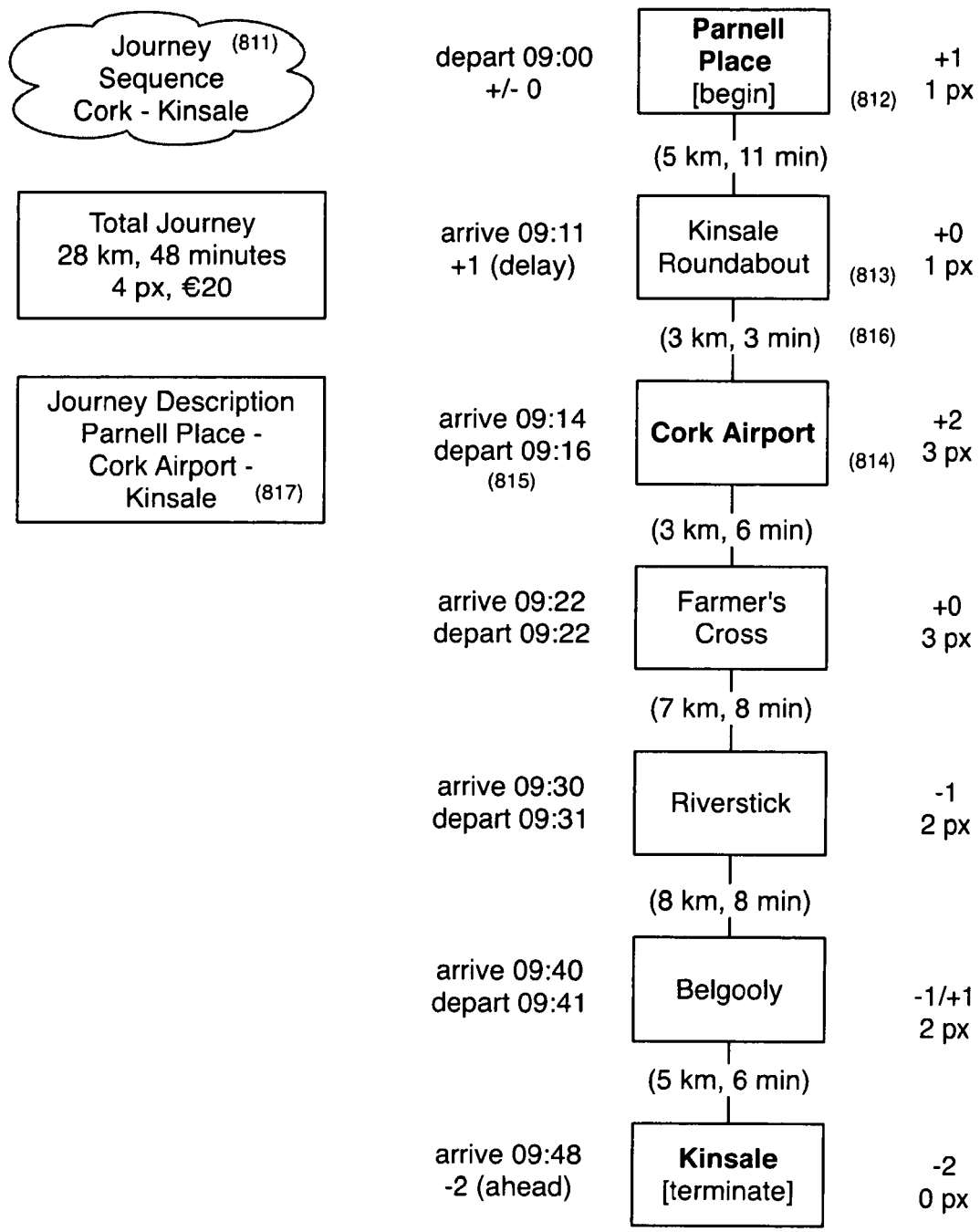
Fig 8b. Driver Journey Logical Characterization

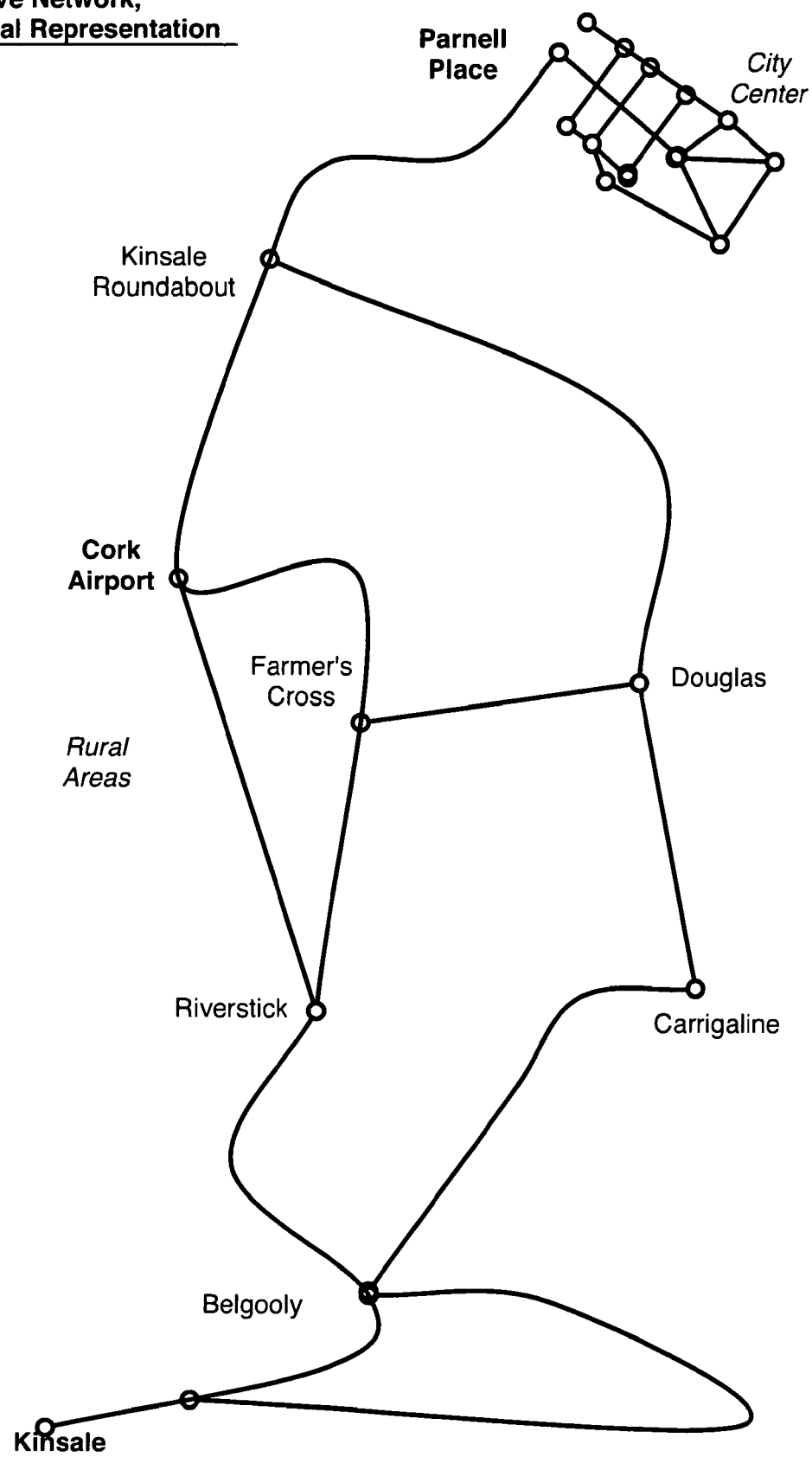
Fig 9a. Active Network, Geographical Representation

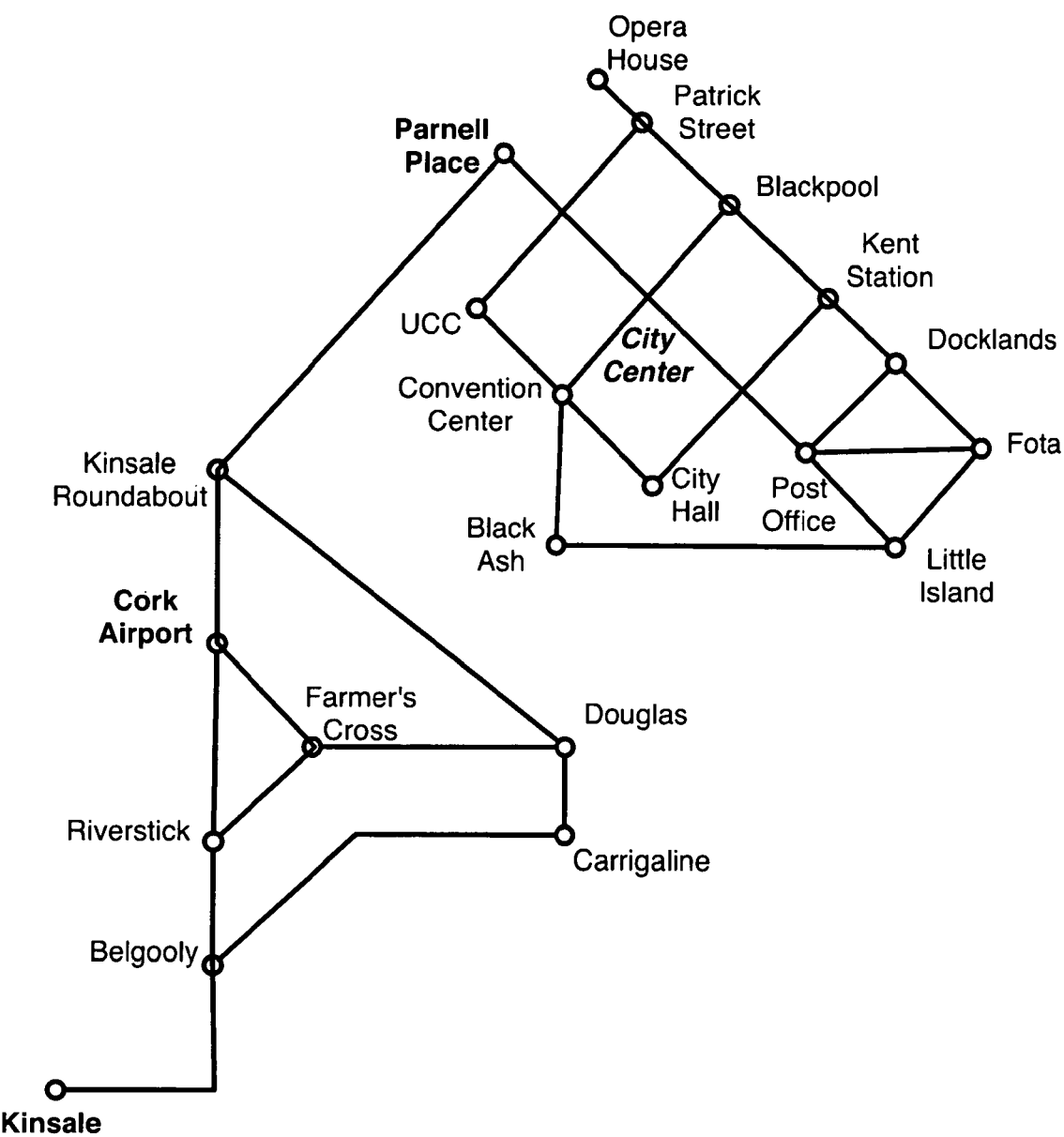

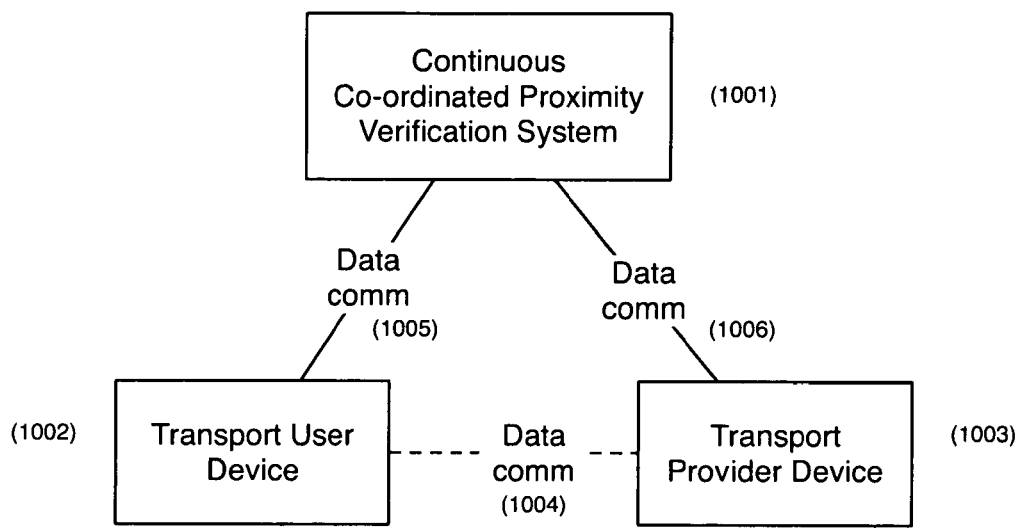
Figure 10a. Elements and communication channels for Continuous Co-ordinated Proximity by independent verification of position

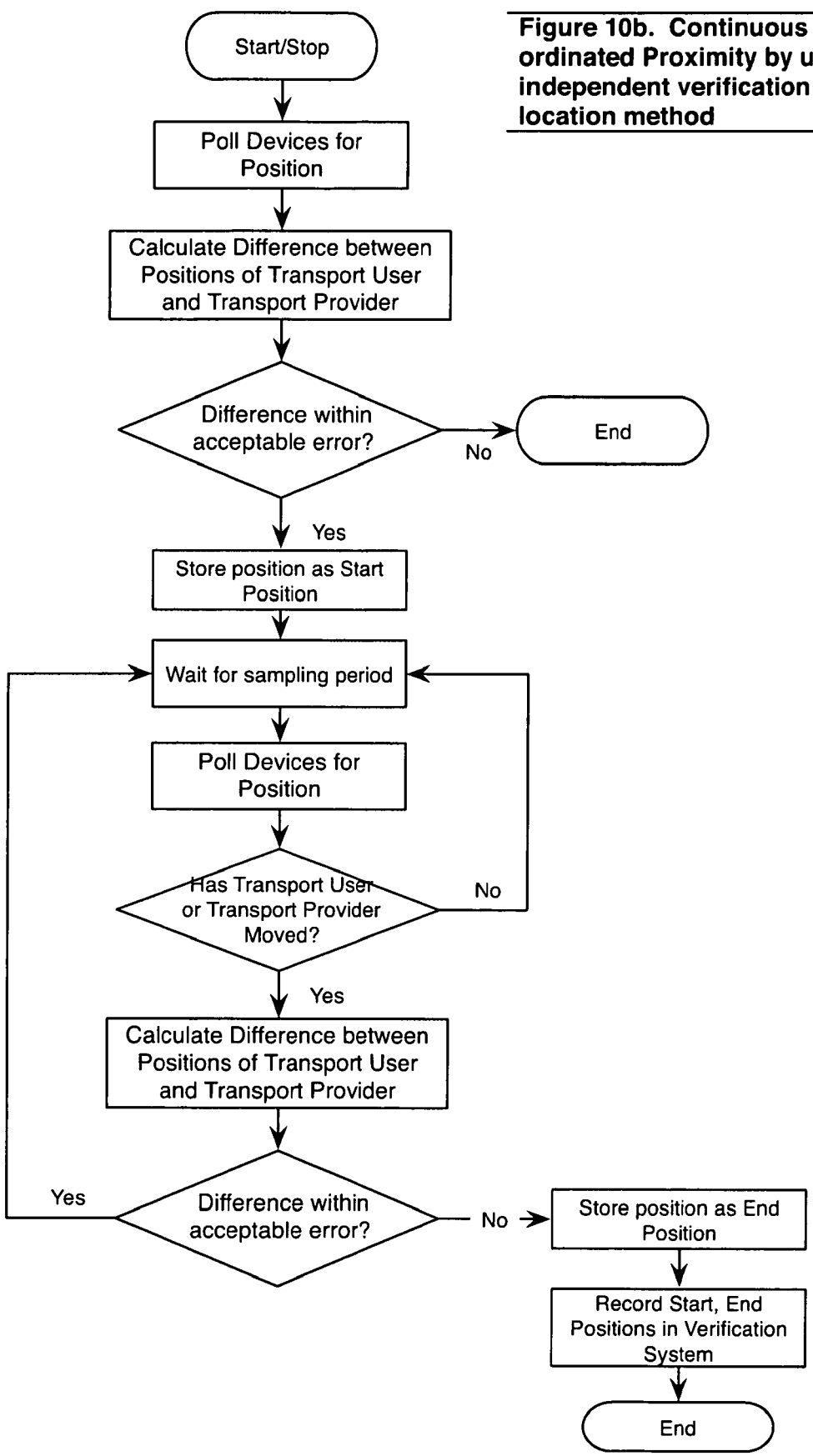
Figure 10b. Continuous Co-ordinated Proximity by using independent verification of location method

Figure 11a. Elements and data communications links in Continuous Co-ordinated Proximity by verification of near-field communications link method
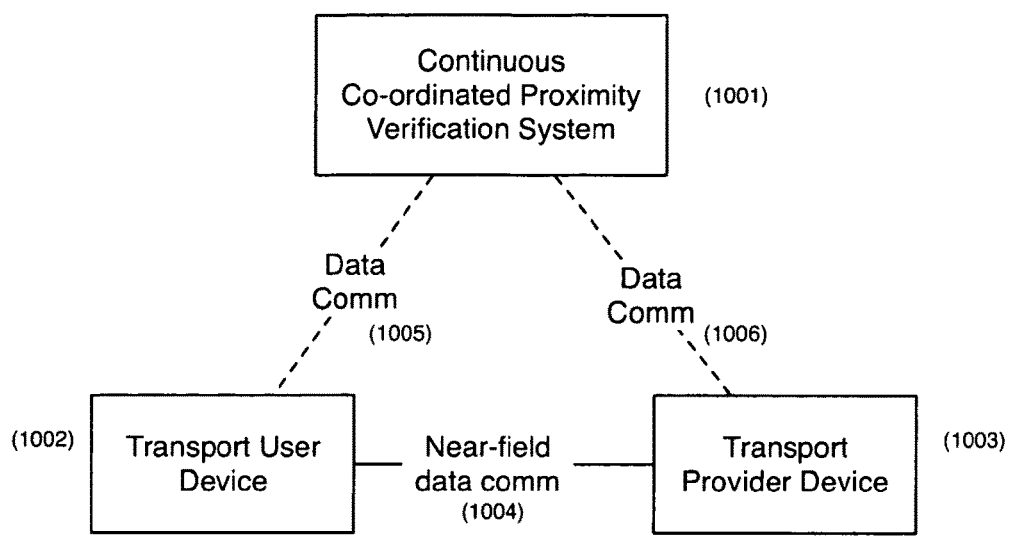

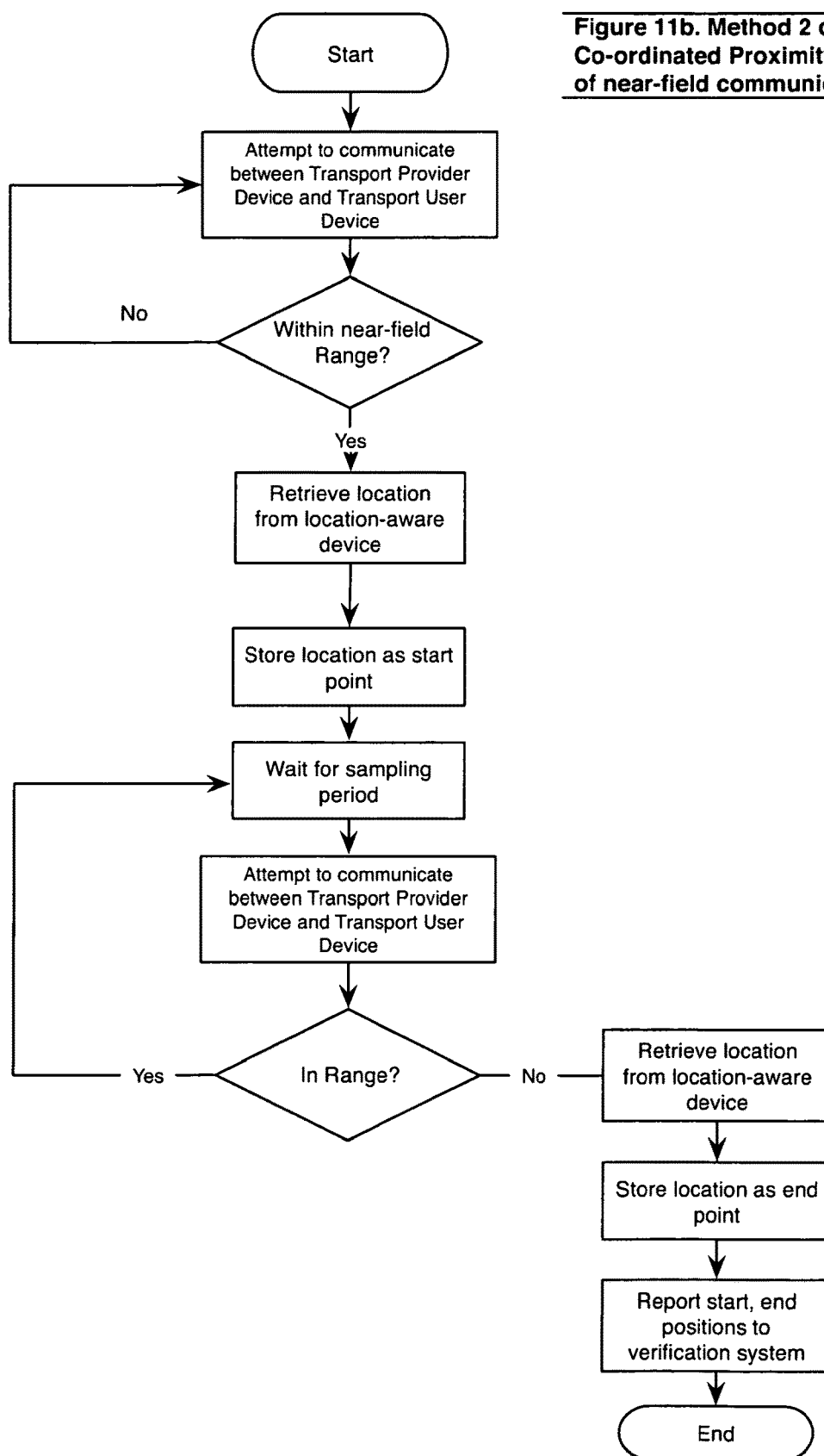
Figure 11b. Method 2 of Continuous Co-ordinated Proximity via verification of near-field communications link

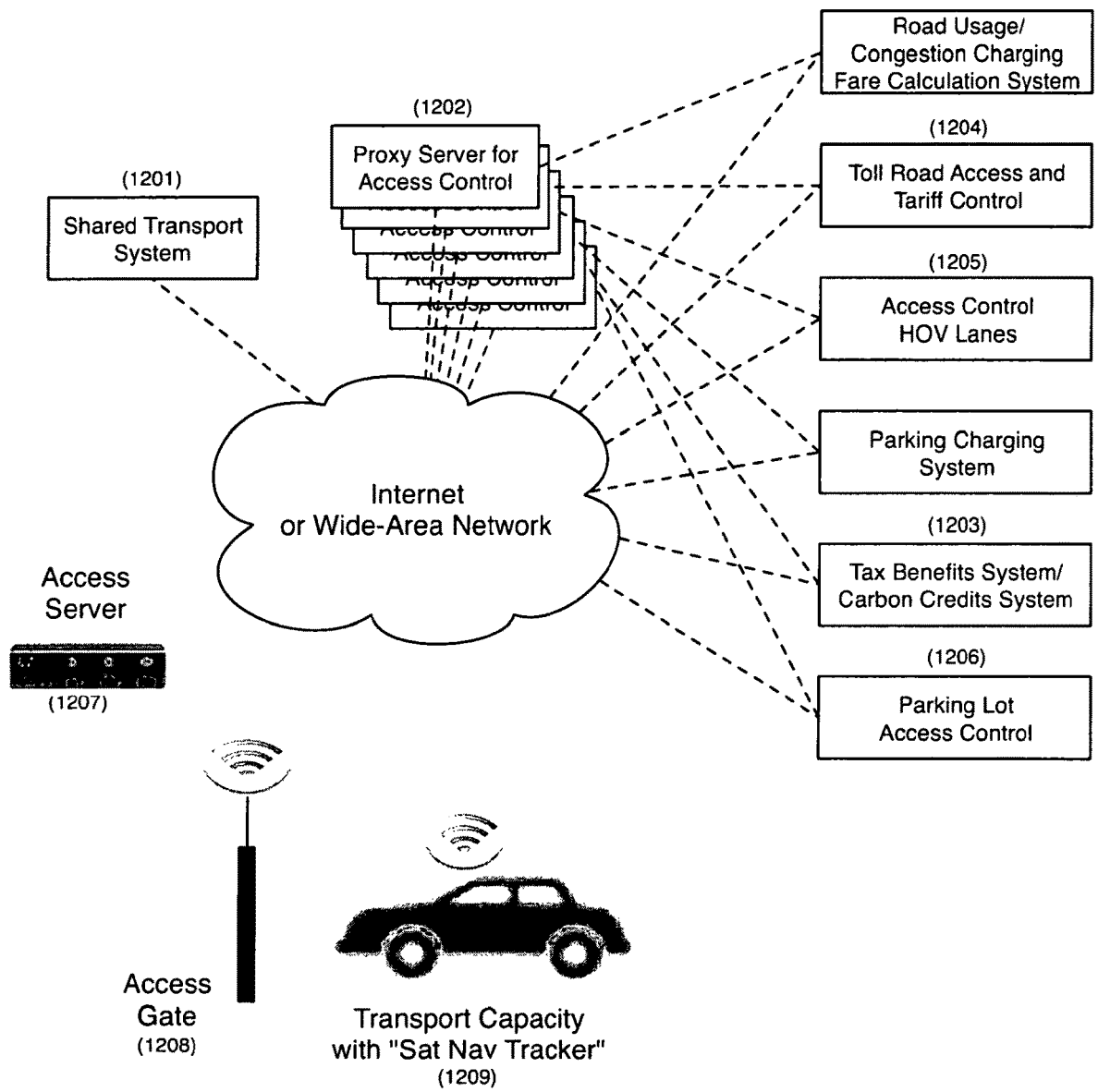

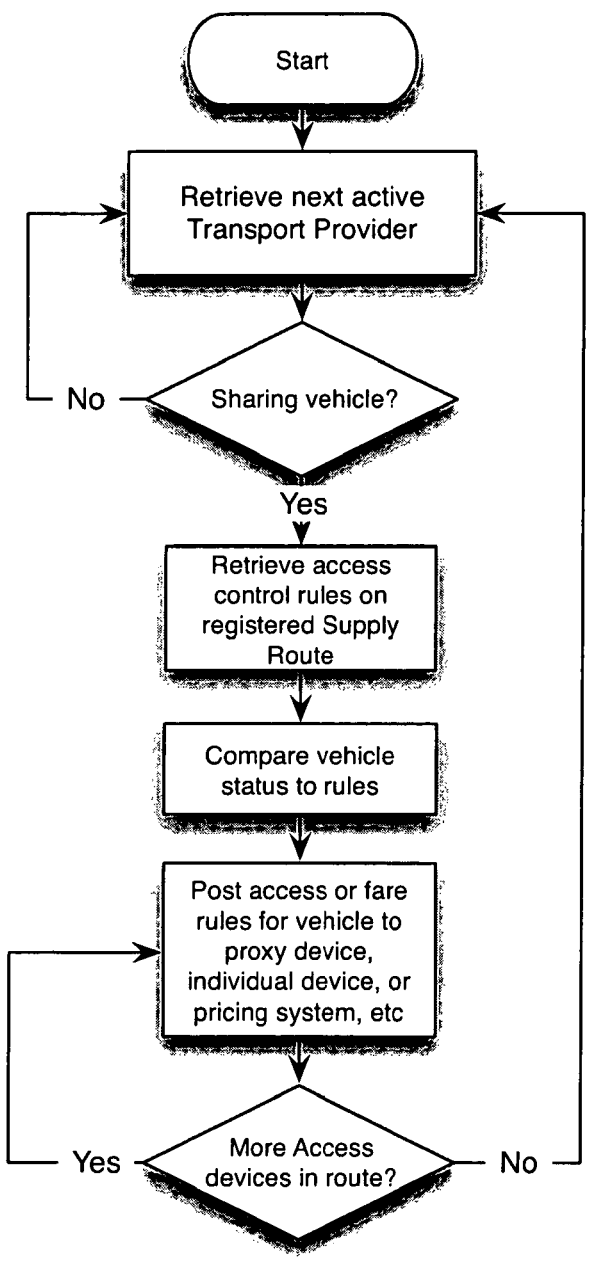

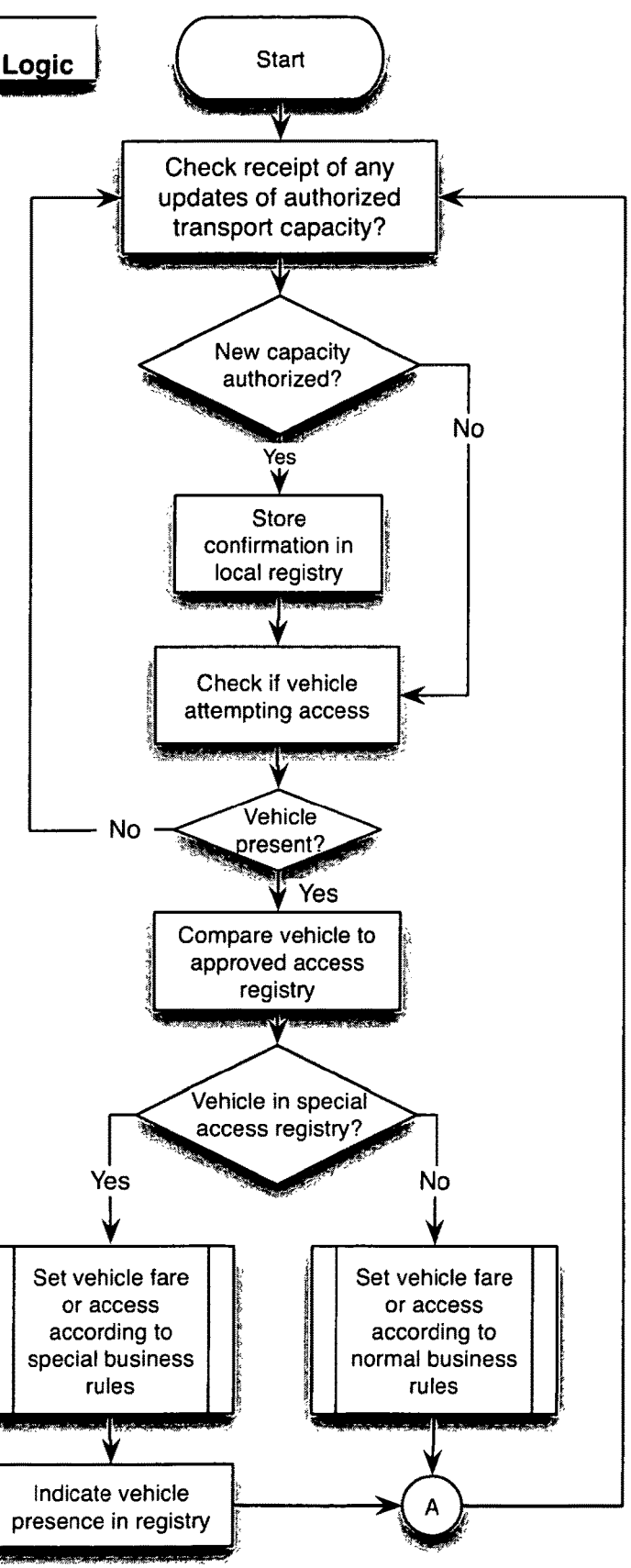

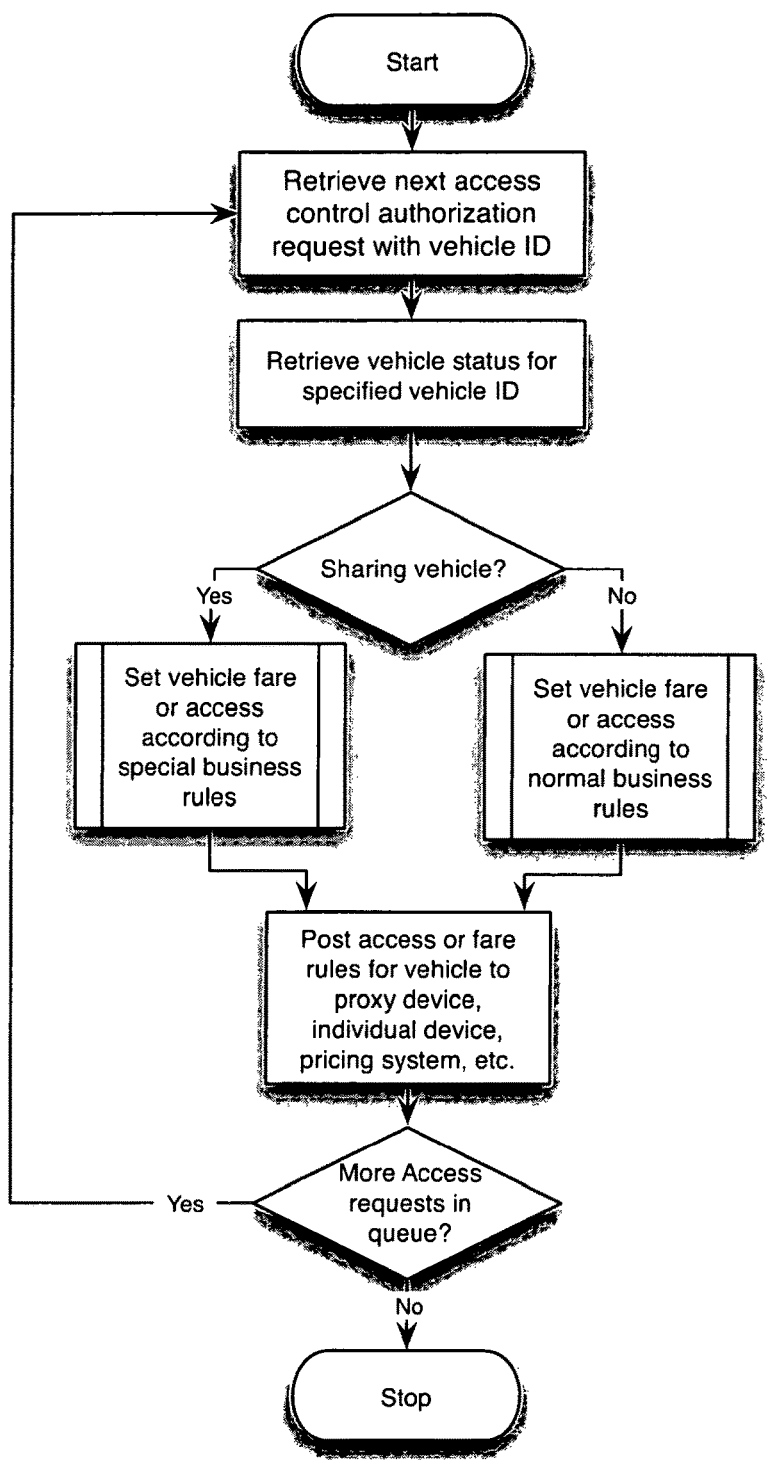

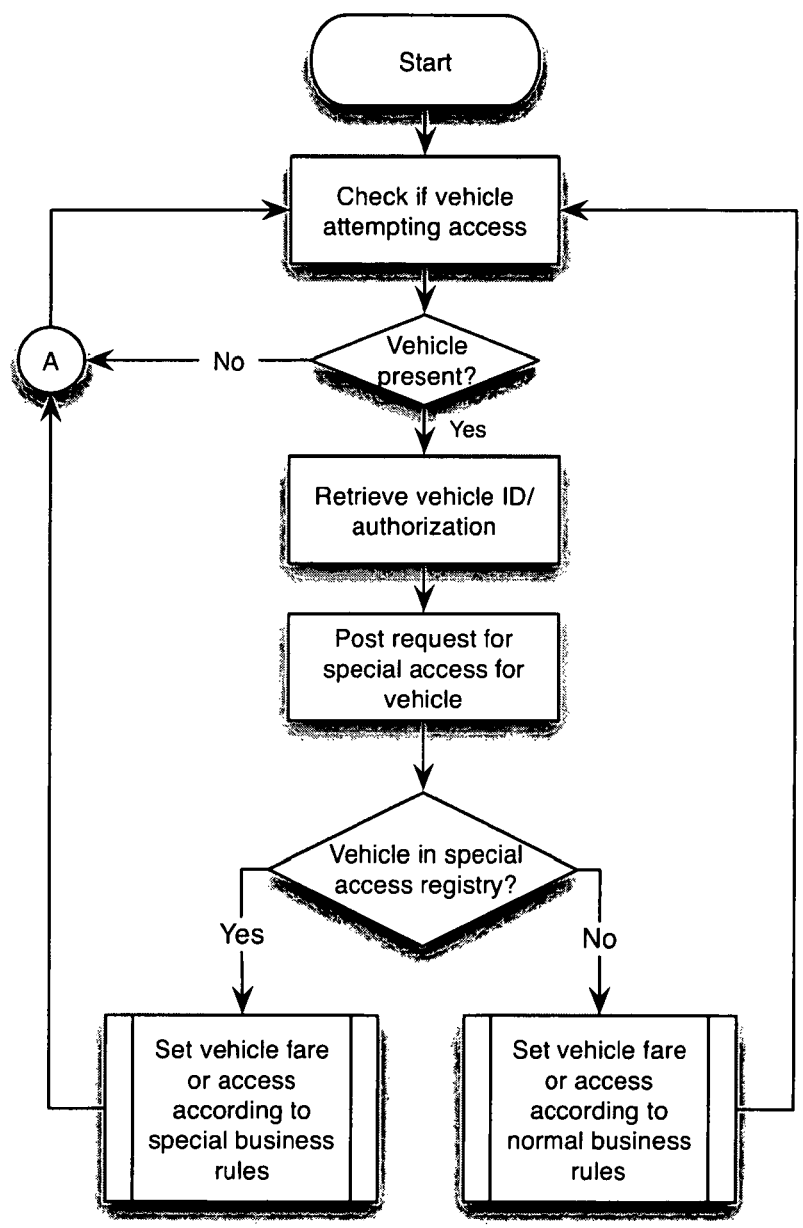

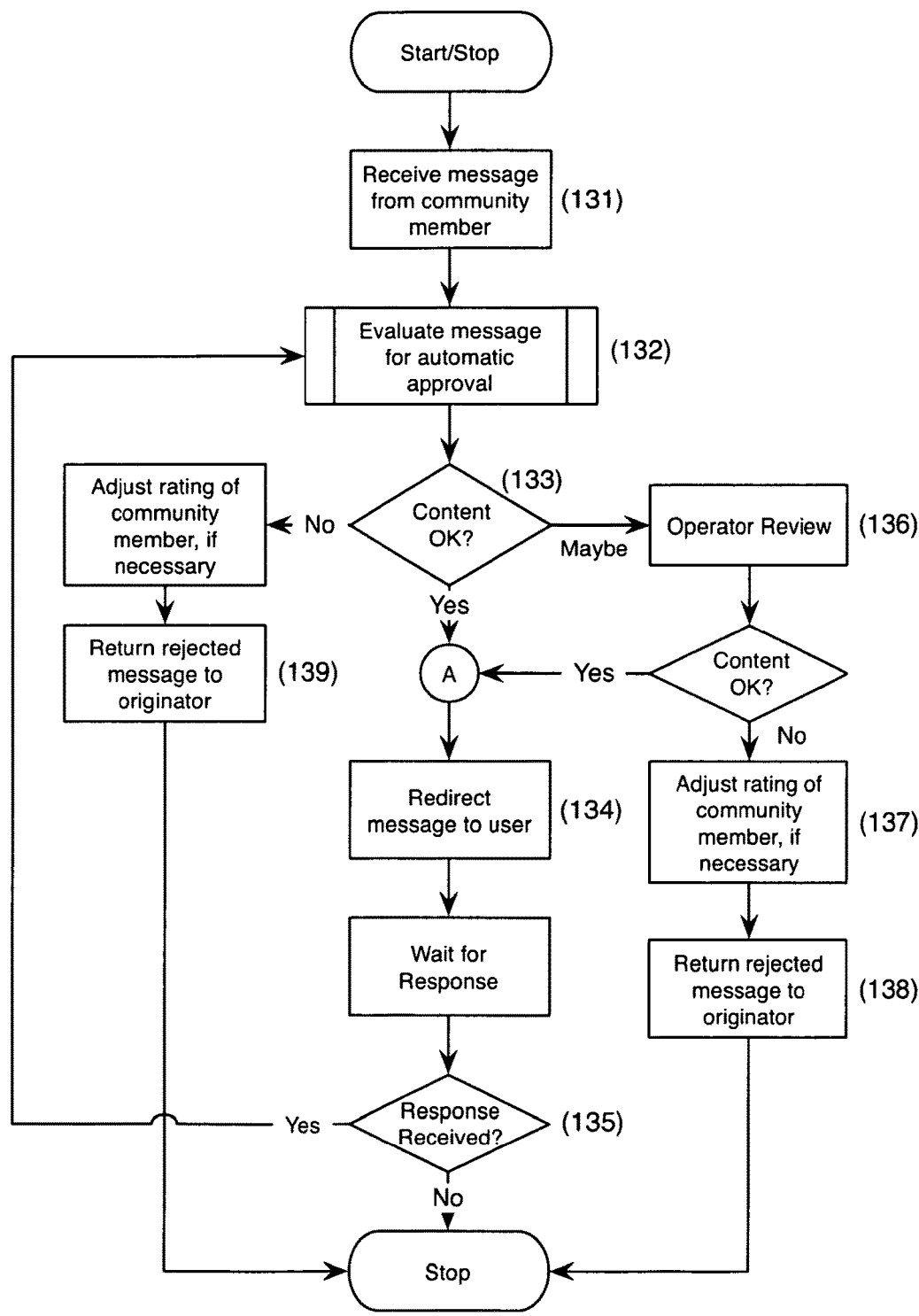
Fig 13. Transport Community Proxy Message Service

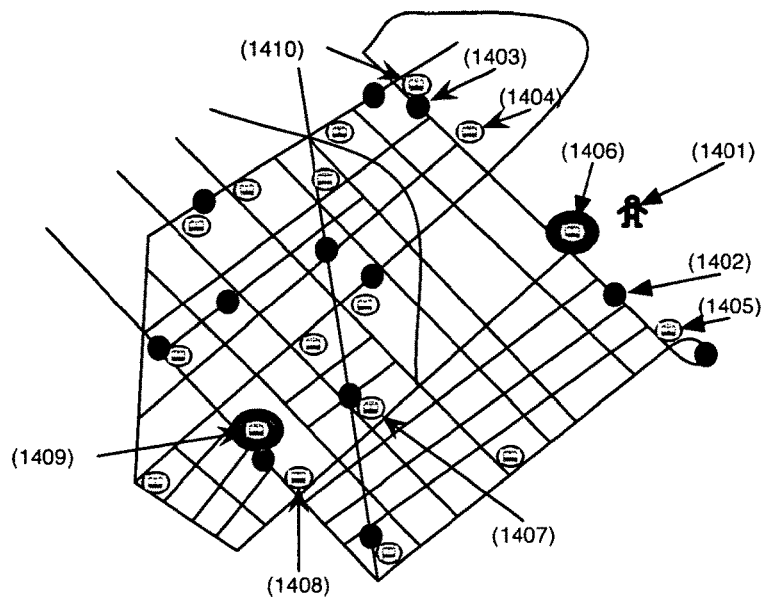
Figure 14a. Full Street, Active Capacity and Node Representation

Figure 14b. Network, Active Street and Capacity Representation
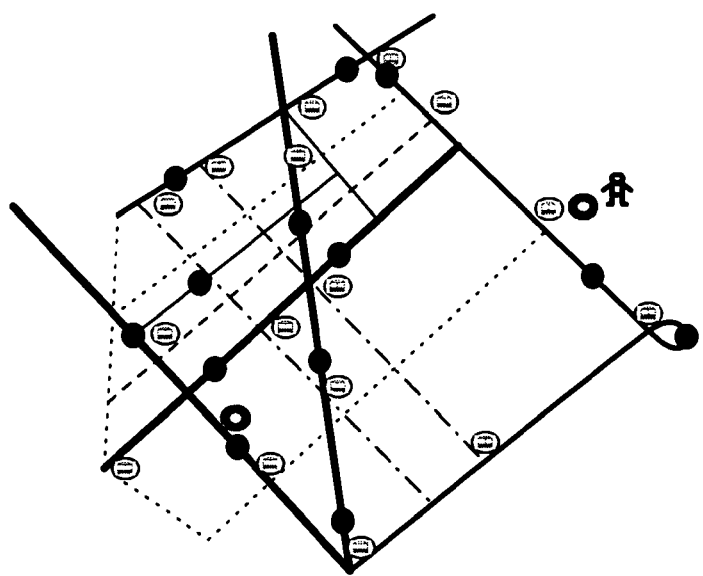

Figure 14c. Network, Active Zero Transfer Street and Capacity Representation from Specific Start Point
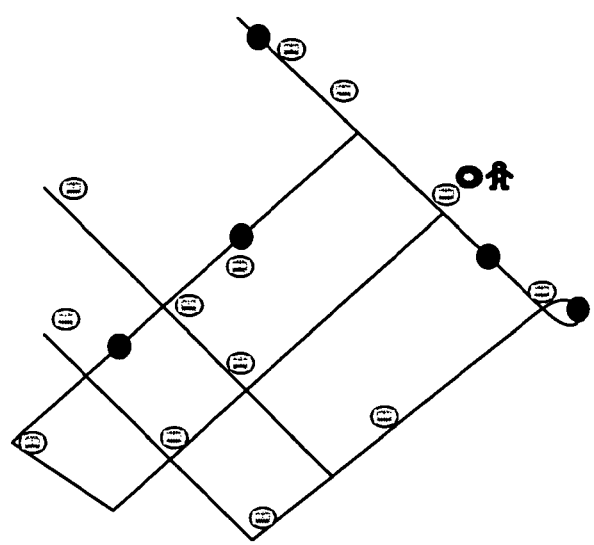

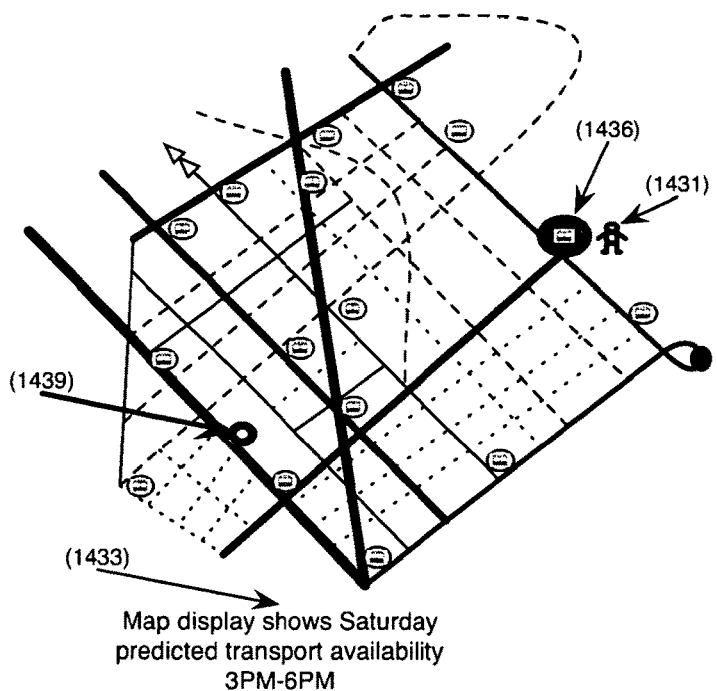

Figure 14d. Stochastic Network, Time of Day Capacity Representation

- (icon) Pick-up/Destination Location
- ◯ Start/Destination Points
- ● Active Transport Capacity
- 🙂 Transport User
- · · · · Infrequent Service (15+ min wait)
- – – – Infrequent Service (10 min wait)
- ——— Frequent Service (5 min wait)
- ▬▬▬ Frequent Service (2 min wait)

Map display shows Saturday predicted transport availability 3PM-6PM

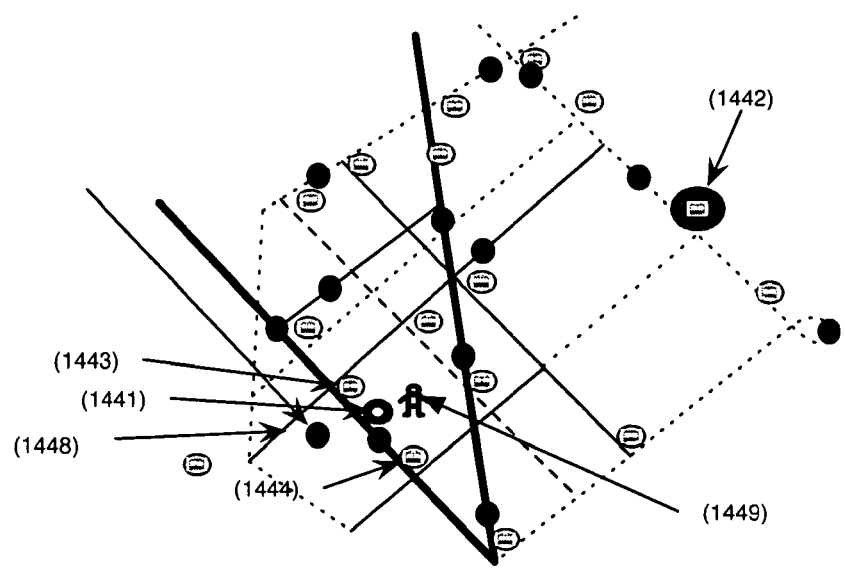
Figure 14e. Stochastic Network, Active Street and Capacity Representation, Specific Departure Point, Outbound

Figure 14f. Network, Wait time and Transfer Representation
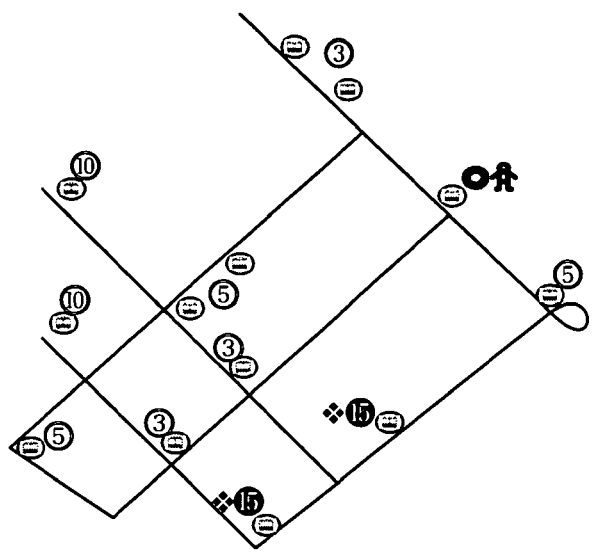

Figure 14g. Stochastic Network, Tabular Representation of Time of Day Capacity

Start Point: 2142 14<sup>th</sup> Ave; (1471)
Destination: 200 Broadway, Troy (1472) (1475)

| Time of Day | Departure Location | Availability |
|---|---|---|
| 5:00am-6:30am | 13<sup>th</sup> St | ⑮ minutes |
|  | 15<sup>th</sup> St | no service |
| 6:30am-7:30am | 13<sup>th</sup> St | ⑤ minutes |
|  | 15<sup>th</sup> St | ⑩ minutes |
| 7:30am-8:30am | 13<sup>th</sup> St | ③ minutes |
|  | 15<sup>th</sup> St | ⑤ minutes |
| (1473) 8:30am-10:00am (1474) | 13<sup>th</sup> St | ⑤ minutes |
|  | 15<sup>th</sup> St | ⑤ minutes |
| 10:00am-4:30pm | 13<sup>th</sup> St | ⑩ minutes |
|  | 15<sup>th</sup> St | ⑮ minutes |
| 4:30pm-7:30pm | 13<sup>th</sup> St | ⑤ minutes |
|  | 15<sup>th</sup> St | ⑤ minutes |
| 7:30pm-10:30pm | 13<sup>th</sup> St | ⑤ minutes |
|  | 15<sup>th</sup> St | ⑮ minutes |
| 10:30pm-2:30am | 13<sup>th</sup> St | ⑮ minutes |
|  | 15<sup>th</sup> St | ① hour |
| 2:30am-5:00am | 13<sup>th</sup> St | no service |
|  | 15<sup>th</sup> St | no service |

Figure 14h. Combination Real-time & Stochastic Network Departure Board for Shared Transport Network

Start Point: 2142 14<sup>th</sup> Ave ← (1481)
← (1485)

| Destination (via points) | Departure Location | Departure (estimated) |
|---|---|---|
| Troy City Center | 13<sup>th</sup> St | ③ minutes |
| Rensselaer (State St, Watervliet) | 15<sup>th</sup> St | ⑤ minutes |
| Cohoes (Green Island, Watervliet) | 13<sup>th</sup> St | (every ⑨ minutes) |
| Albany Street | 13<sup>th</sup> St | (every ⑮ minutes) |
| Broadway | 15<sup>th</sup> St | (every ⑨ minutes) |

(1483) (1485) (1486) (1487) (1482) (1488)

Figure 14i. Real-time Journey Planner for Shared Transport Network, Fixed Start & Destination Points, Tabular Representation

Start Point: Essex Fells, NJ ← (1491)  (1494)
Destination: 222 E 32nd St, New York ← (1492)
Departure Time: Now (9:22am), Distance: 22 miles   (1495)  (1496) (1497)

| Options (1493) | Departure / Arrival | Departure (estimated) | Cost | Arrival Time |
|---|---|---|---|---|
| Option 1:<br>  Shared Transport | Roseland Ave /<br>3rd Av & 32nd | ③ minutes | $7.80 | 10:15 am |
| Option 2:<br>  Shared Transport +<br>  Path + Subway (1498) | Bloomfield Ave /<br>Park Ave & 34th | (every ⑤ minutes) | $6.50 | 10:38 am |
| Option 3:<br>  Bus + Shared Transport | Bloomfield Ave /<br>2nd Ave & 32nd | (every ① hour,<br>next 9:35 am) | $6.20 | 10:45 am |

SYSTEMS AND METHODS FOR VERIFYING HIGH-OCCUPANCY VEHICLE JOURNEYS AND DETERMINING PREFERENTIAL ROAD ALLOWANCES

This application is a continuation of and claims the benefit of priority to U.S. Nonprovisional patent application Ser. No. 15/998,864, filed on Aug. 17, 2018, which is a continuation of and claims the benefit of priority to U.S. Nonprovisional patent application Ser. No. 12/924,487, filed Sep. 28, 2010, now U.S. Pat. No. 10,083,608, issued Sep. 25, 2018, which is a divisional of and claims the benefit of priority to U.S. Nonprovisional patent application Ser. No. 12/069,656, filed Feb. 12, 2008, now U.S. Pat. No. 7,840,427, issued Nov. 23, 2010, which claims the benefit of priority to U.S. Provisional Patent Application No. 60/900,808, filed Feb. 12, 2007, all of which are incorporated herein by reference in their entireties.

This invention relates to a ground transportation network. More particularly, this invention relates to a ground transportation network matching individuals with transport capacity on a supply and demand basis.

Transport capacity, for example cars, often travel long distances with minimal load (i.e., SUVs on daily commutes with only the driver occupying the vehicle). Such capacity is disused because of a number of reasons, including (a) an occasional need for greater capacity causes consumers to buy excess transportation capacity, (b) variations in schedule and destinations traveled create non-matched transportation needs compared with other household members, (c) lack of knowledge of trusted users who could conveniently use this excess capacity, and (d) difficulty in providing an economic benefit to incentivize the driver to share their excess capacity. Meanwhile, the driver of a vehicle often has no choice but to use a personal transport vehicle (despite the high costs involved) because of lack of accessibility, inconvenient scheduling, or multiple interchanges required if they were to rely on public transport systems.

Proposals have been made, for example, in U.S. Pat. No. 6,697,730, to use a central assigning system and communications devices adapted to be associated with vehicles for transmitting information from the vehicles to the central assigning system, and for receiving information from the central assigning system. In the 1990s, the US Department of Transportation designated this "Dynamic Ridesharing" area a specific area of research interest, under the designation ATIS8 as part of the National ITS Architecture, and has proposed methods for transactions, interchange of billing data, and the like. Such systems, if implemented, would represent advances over methods in common practice, however, it is believed the invention described herein makes such systems more practical and useful because of the following significant innovations and claims: methods to reduce the workload/steps necessary on the driver and the rider to make this system more inconvenient; methods to improve the trustability of drivers and riders, increasing the likelihood people will use this system; a hardware device which would communicate visually to external riders; automatic determination and registration of transport capacity destination and capacity, increasing availability of shared transport vehicles; methods to characterize and publish information about "ad-hoc" transport capacity in manners similar to traditional, centrally controlled transit systems, in order to increase trust and ridership in the system; and an ad-hoc nature to the proposed system which enables casual use by registered users.

The inefficient use of transport capacity results in approximately 3-4 times as many cars on the road as would be necessary if capacity were only 50% occupied. This has the additional implications created by the excess consumption of fuel in potential environment problems ($CO_2$ pollution and global warming) as well as geopolitical problems (for example, many countries including the United States could be energy self-sufficient if they used their existing transportation capacity only 40% better (versus the 200+% better that could theoretically be achieved).

In cities such as Los Angeles, the transportation network is largely dysfunctional (i.e., the average worker spends 1.6 hours of their day in unproductive and costly commuting via personal car on congested highways). Additionally, such a consumer cannot rely on public transit because mass transit "doesn't take them from where they live to where they work".

Inadequate "feeder systems" for the public transit network mean that billions of dollars are spent creating subway and rail systems that are massively underused, in terms of persons transported per hour versus the potential capacity of these rail systems. The flexibility of highway and road networks, along with the critical mass of car penetration and the marketplace dynamic of urban real estate value, however, means that wherever a highway is built, personal transport cars will soon fill it, creating further urban sprawl, with all the societal and ecological disadvantages that implies.

Personal transport cars are common, among other reasons, because (a) the lack of availability of mass transit networks to serve the home or destination of the driver, (b) the inconvenience of waiting a long or unknown period of time for public transit, (c) fear of traveling with strangers or fear in waiting for long periods at public transit points.

Many large cities have successfully implemented mass transit systems which are widely used by people from a wide variety of socio-economic backgrounds (i.e., London, New York, Madrid, Tokyo). While even these systems can be improved, these examples show that if a Shared Transport system exists with sufficient timeliness and advantages, it will be widely used. These cities provide transit systems because these systems reduce their cost for infrastructure (i.e., building ever-larger and more inefficient highways) and increases productivity for their citizens and the companies in their region.

So, cities have long sought to provide mass transit systems which take people from where they live to where they work and/or where they shop. However, since the popularization of highways in the 1950s in the US, cities have become increasingly suburban. Highway systems do not complement mass transit systems and, in fact, work against mass transit systems by enabling urban sprawl to the point where mass transit infrastructure is unsustainable (at the extremities of a city center, due to lack of population density) and unattractive (because of inconvenient intermodal interchange). As fewer people use mass transit, less routes are supportable, less area is reachable via mass transit, and thus more people need to rely on relatively costly and ecologically damaging individual transport, resulting in the mass transit system itself imploding with a lack of critical mass, while personal transport systems simultaneously suffer through massive over-congestion.

It is an object of the invention to provide a system that enables regular highway traffic and privately owned personal transport systems to augment and enable public mass transit networks.

It is another object of the invention to match a need to move individuals and/or goods from one geographic point to another geographic point ("Transport Demand") with an unrelated driver's unused transportation capacity.

It is another object of the invention to provide riders and transport providers with information services and content that adequately enable the use and expansion of such a system.

Briefly, the invention provides a network system that matches the supply and demand of transportation services by incorporating unused transportation capacity (i.e., empty seats) with a real-time allocation and matching service that enables individuals and goods to conveniently hire that capacity with attractive pricing, rapid responsiveness, better information availability and trusted security.

The network system incorporates telecommunications and computing technology to match the supply of excess transport capacity with the demand for personal transport. In areas where a critical mass of transport providers can be established, this system aims to provide pick-up and drop-off service to within a few hundred yards to the majority of locations in the covered area, with response/waiting times of 3-15 minutes under optimal circumstances. In addition, different levels of service can be provided, including the provision of transport for goods, persons with special needs, and persons or goods within closed communities of transit providers.

The network system ("Shared Transport System") demonstrates how interconnecting personal communication devices and computer networks with personal and corporate Shared Transport vehicles can (1) provide revenue streams to drivers who share their vehicle, (2) provide security through the provision of track-ability and identification of both drivers and Riders, (3) provide "feeder systems" for public transit networks, (4) provide trusted networks of pre-approved providers to accommodate scheduled services for special needs cases, such as children or physically disabled persons, and (5) provide a variety of service levels for those who need more than just commuter style transport.

It is believed that an efficient use of the network system would mean that a significant fraction of those households with two or more cars would no longer require the additional car, and that a smaller portion of a national economy will be devoted to widening and expanding a country's highway networks and importation of energy sources such as oil.

The below "Shared Transport System" accomplishes this aim by enabling private transport vehicles to serve as an extension of the mass transit system. Where no mass transit is available, or is inefficient, private transport vehicles can act as a public transport mechanism. Where mass transit is available and cost effective and timely, private transport vehicles act as a feeder network to the public transit system.

In situations such as a daily commute, predictable trends will flow from the data generated by this shared ride system, and will enable rapid and flexible route allocation that will enable public or private mass transit providers the capability to offer new transit services, such as bus routes, that are determined via stochastic measurement. A rapidly responsive and timely public transit network will result in increasing numbers of public transit riders and recreate the market parameters that are needed for mass transit systems to gain critical mass in ever changing and expanding markets.

Whereas, many systems exist for measurement of traffic over specific sections of road network (loop detection systems, video camera monitoring systems), the bulk of these systems are infrastructure dependent and typically measure the transport throughput of a given road segment, without capability to evaluate the total journey of the vehicle. It is well known, as well, that GPS systems could be used for the generation of road usage charging systems that are anticipated to come into use in the next several years. There are also systems in use, or proposed, that allow traffic speeds to be measured (and displayed on interactive maps) by the collection of data about the speed of a vehicle ("probe vehicles") to characterize the speed of segments in a traffic network. However, the advantage of the present system is that it uses the speed, journey start and end points, intermediate destinations, spare vehicle capacity, and vehicle type characteristics of registered transport capacity to automatically generate specific information about journey capabilities between any point in the covered road network. The availability of this information is believed to be critical to the success of user acceptance of this method of transport.

A current drawback to carpooling systems, that of lack of information about the availability of services and timing between locations, can be overcome through the display of the available transport capacity.

Current mass transport systems, typically run by governmental organizations, provide schematic diagrams of the locations served by these networks, and timetables of operations. These schematic diagrams give confidence to the transport user that there is a steady flow of available capacity that they can rely upon. With this confidence, the transport user can elect to rely on public transport rather than purchase a car or second car for their household. However, carpool systems have had no equivalent, because these carpools are traditionally organized between a small group of tightly associated individuals.

The present system generates schematic and geographic maps indicating coverage areas, and is also capable of indicating typical availability and travel times at a variety of times throughout the day or week, based off a model of historic usage and travel times ("stochastic model").

Another drawback to current carpooling systems, due primarily to the difficulty of co-ordination and lack of computing and communications capabilities, is that they assume the transport user must go to the same destination, or along the route of the transport provider. This is often suboptimal, as transport is often a "last mile" problem, and if one transport provider moved the transport user to another location where they could get directly home (using either public transport or the present system), the use of transport capacity could be made much more efficient, and vastly extend the possible reach and combinations of destinations. The present system, because of its ad-hoc nature and computational network model, can provide these transfer instructions to the transport user, and, importantly, providing graphical presentation of the reach of the transport network, giving confidence to the user that they won't be stranded.

Above was mentioned the issue of fear of traveling with strangers in public transit systems. The below system incorporates a security verifying and rating system to provide that the strangers in Shared Transport systems are trustworthy. For example, (a) bad drivers (those with excess points or driving convictions) are not allowed to participate in the system, (b) drivers with continually risky behavior are identified through a real-time rating mechanism available to riders and the in-car computer measurement system, (c) drivers who do not pick up riders are rated for their proclivity for failing to do so, (d) riders are rated for unusual behavior through a rating mechanism available to drivers, and (e) riders who refuse rides or miss rides are rated for their proclivity for doing so.

Alongside the issue of trustable strangers is the issue of anonymity. Riders or drivers may be concerned about their safety if a stranger knows how to contact them via their phone. Thus, the below system incorporates a mechanism allowing riders and drivers to contact each other through their phones without knowing the other's phone number or full name, yet still allowing, for example, a driver to message a rider that a hat was left in the vehicle.

These and other objects and advantages of the invention will become more apparent from the following detailed description taken in conjunction with the accompanying drawings wherein:

FIG. 1 schematically illustrates a network system in accordance with the invention;

FIG. 2 provides a table of the transport capacity computing and communications components of the network system in accordance with the invention;

FIG. 3 provides a table of the rider technology components and rider demand request details of the network system in accordance with the invention;

FIG. 4 graphically illustrates the marketplace actors, their modes of access, information options and specification for operations of the network system in accordance with the invention;

FIG. 5a graphically represents the steps of the rider in using the network system in accordance with the invention (Rider Experience);

FIG. 5b provides a table of some functional options of information specification and actions of the rider in accordance with the Rider Experience;

FIG. 6a graphically represents a flow chart of the experience of a driver (Driver Experience) in accordance with the invention:

FIG. 6b presents a table of some functional options within the driver experience and subsystems in using the network system in accordance with the Driver Experience;

FIG. 7 graphically illustrates various components, subsystems and databases required for an optimal implementation of the invention;

FIG. 8a graphically represents the geographic track of a driver on their journey between a journey start point and the journey destination, shown as a dark solid line from Parnell Place to Kinsale;

FIG. 8b logically represents the driver's journey of FIG. 8a with certain intermediate destination points of the driver's journey summarized, along with activity at each point and the variation of timing as expected by the shared transport active management system for that time of day on that route;

FIG. 9a shows a representation of the shared transport network at a moment in time, where active capacity is available (or expected to be available);

FIG. 9b shows a logical representation of the shared transport network displaying each stop using compact orthogonal and diagonal lines rather than geographic lines to emphasize the city center network's interconnections, to minimize distances in the rural areas and to present the network in a more readable format;

FIG. 10a shows elements and data communication channels used to determine continuous co-ordinated proximity using a method where it is desired to have independent confirmation of the positional location;

FIG. 10b represents the logic between elements of FIG. 10 to determine and report on when and where the elements are in continuous co-ordinated proximity;

FIG. 11a shows elements and data communications channels used to determine continuous co-ordinated promixity using a method where it is desired to use near-field communications as means for verifiable proximity;

FIG. 11b represents the logic between elements of FIG. 11a to determine and report on when and where the elements are in continuous co-ordinated proximity;

FIG. 12a graphically illustrates elements of an Access Control System that would allow restricted or favorably charged access to road or parking resources depending on acceptable business rules for each type of use in accordance with the invention;

FIG. 12b shows the server-side logic of the Access Control System where this authentication is, in the preferred implementation, pushed to the local device (where such information needs to be processed in real-time);

FIG. 12c shows the client-side logic of the Access Control System where this authentication is, in the preferred implementation, pushed to the local device (where such information needs to be processed in real-time);

FIG. 12d shows the central server-side logic of the Access Control System where this authentication is pulled from the server or cached servers (may be more appropriate in certain applications or for after-the-fact tariffs, etc);

FIG. 12e shows the client-side logic of the Access Control System where this authentication is pulled from the server or cached servers (may be more appropriate in certain applications or for after-the-fact tariffs);

FIG. 13 shows the logic of a communication system which proxies messages between a transport user and transport provider, providing as well an operator intervention and automatic rating adjustment to the user's trust level if inappropriate content is requested to be transferred;

FIG. 14a graphically illustrates a geographical representation of an example shared transport network at a fixed moment in time, with pick-up locations and active vehicles in the shared transport network shown on a street map;

FIG. 14b graphically illustrates a geographically simpler representation of the above network with all the street network segments that cannot be reached reduced out of the diagram to make it easier for the transport user to see what service is available;

FIG. 14c graphically illustrates a representation of the above network with only those locations that are directly reachable without transfers, and only those vehicles that are relevant to the starting location of the transport user;

FIG. 14d graphically illustrates a representation of the above network, showing the capacities and capabilities of the overall shared transport network, based on a stochastic model, which therefore is used to illustrate the capacity and capability of the network on average, at various day-parts, or using other criteria as specified by the system or by the user;

FIG. 14e graphically illustrates a representation of the above network, coded with colors, icons, text, and/or line thickness to indicate the number of transfers, wait time, and potentially other factors, necessary for the transport user to reach their destination;

FIG. 14f shows a representation of the above network, showing times of arrival for a given departure point, and whether a transfer was necessary from that point;

FIG. 14g provides a table presentation of the above network, showing time of day output of a hypothetical stochastic model for a set journey start and end point;

FIG. 14h provides a table presentation of the above network, showing a real time "Departure Board" for a given start point in a combined stochastic and real-time traffic and capacity model of the network; and FIG. 14i provides a table presentation of the above network, showing a real time "Journey Planner" for a given start location and destination location, with information including the available transport options, pricing, and arrival times using the transport method.

Referring to FIG. 1, a person 10 desiring transportation service ("Rider") has a personal communications device 11, optimally equipped with location information ("GPS Phone"), and uses this device 11, optimally equipped with a software layer with transport intelligence ("Rider Software Interface"), to signal a transportation marketplace network ("Shared Transport Marketplace") 12 with a demand interest for a particular start-point ("Pick-up Point") and endpoint ("Destination Point", and together, the "Demand Route"). The Rider 10 has previously registered with the Shared Transport Marketplace 12, providing whatever registration details are necessary to contact and verify the identification of the Rider 10.

Alternatively, the Rider 10' may employ a fixed communications device 11' in order to communicate with the Shared Transport Marketplace 12.

At the same time, all vehicles that wish to provide transportation services which are in transit ("Transport Capacity") have a navigation device, typically using GPS or other location finding technology, with built-in or external data communication capability, typically using cellular phone or wide area wireless data networks ("Sat Nav Tracker"), running a software layer with a Shared Transport interface ("Driver Software Interface").

When a driver starts the vehicle ("Driver" 13), a Driver Software Interface automatically determines if the Driver 13 is engaged in a traditional route ("Supply Route"), and registers the transport capacity of the Driver 13 ("Transport Capacity") with the Shared Transport Marketplace 12. Alternatively, if the Driver is not engaged in a traditional route, the driver is prompted for their destination, or possibly is shown a list of riders possibly headed in the same general (or likely) direction as the Driver, for the Driver to consider sharing, if the Driver's destination is not known. This Transport Capacity would be then registered with the Shared Transport Marketplace 12.

The Shared Transport Marketplace 12, which is also accessible by any internet terminal, provides to the Rider 10 and to the Driver 13 information about Transport Capacity and Transport Demand. Optimally, this marketplace 12 is automatically populated with Supply Routes of public transport (buses, trains, commuter bus lines), to provide the Rider 10 with a variety of service types and prices to choose from. Additionally, given the on-demand nature of rides and personal transport, stochastic models can populate the Supply Routes and Demand Routes, in order to enable the Rider 10 and Driver 13 to make better transport decisions. For example, a Rider 10 in a subdivision of 500 homes at 8:30 am on a weekday may poll for a Demand Route and see that the only options available from his house to his destination, e.g., Dublin, are a bus that leaves in 90 minutes for €4 or a taxi that could be available in 10 minutes for €35. Given these options, the Rider 10 would possibly be forced to choose a taxi. However, if the stochastic model indicates that 60 cars depart from that subdivision for Dublin every weekday morning between 8 am and 9 am, the Rider 10 could be provided the information that, with 90% certainty, a Supply Route would be available in 4 minutes for €4.50. (That is, the Driver of this car in that subdivision simply has not turned on his car yet, and would only be in the subdivision for 2 minutes before leaving it for the highway. Therefore, the value of stochastic probable route offerings dramatically increases the quality of the information provided to a prospective Rider; and thus also increases the likelihood of Riders choosing to used Shared Transport in general). Means of displaying this capacity and providing useful decision-making ability to the Transport User are described in further detail below.

The Driver 13 could pre-register a specific price for a given transit route, or could change their price on-the-fly for a route to reflect the supply and demand for that Route, and the class of service provided (for example, charging more for a Rider who has excess luggage, or for direct point-to-point service by taxi transport, or for inclusion of in-vehicle wireless Internet access in places where that service is available).

Normally, however, pricing for a route would be determined by means such as per mile default rates, the number of seats occupied and other preset fixed and variable charges (zoned pricing, etc). While it is anticipated that some users of this system, particularly those Drivers with minibuses or even buses, could use it for profit-making routes, it is thought that normally the individual consumer user will simply be recovering some or most of their transport costs. Some applications may offer services without any charge or billing whatsoever.

One of the possible means, and the most likely, of determining positioning for the Sat Nav Tracker device 17 and the GPS Phone 11 is through the use of a GPS 14 or Magellan satellite as indicated in FIG. 1. Other means for determining position include the use of cell phone towers to determine location, position look-up from WiFi hotspot data services, etc.

Use may also be made of the Internet as indicated in FIG. 1, as one of the means of communicating to and from users and drivers and from fixed kiosks to register trip requests.

The Rider 10, depending upon the mode preferred and the equipment available, can select a Pick-Up Point and Destination Point through a variety of functionally equivalent methods, including (1) calling a person or voice-response system via telephone whom they can tell verbally or through a DTMF IVR system; (2) using SMS via telephone, or e-mail, with text indication of Demand Route (i.e., "Go Home", or "Go from 12 Marlboro St to Albany Airport"); (3) via an Internet web interface or dedicated kiosk; or (4) via a GPS Phone with an intelligent and data-driven software interface.

The Rider 10, upon submitting a Demand Route into the Shared Transport Marketplace 12, could be presented with a sorted list of the transport options available, by class of service, type of vehicle, time until Transport Capacity arrives at start-point, estimated transit time to end-point, number of legs in the journey, and cost.

The Destination Point could also be specified by category or purpose, in order to increase the transport availability and options for the Rider. For example, if the Rider just wants to go to a shopping center, and there are 10 shopping centers in various directions, they could register the general category, and make their selection from the available transport options at that point. This could also be limited by brand, such as Starbucks coffee shops or RadioShack electronics stores; or, in the case of purpose, the Rider could register a request to see a particular movie, regardless of the cineplex where the film was playing.

In the event that the Rider 10 has a Rider Software Interface on their phone 11, the Rider 10 selects from the options available to them. A message is sent to the nearest appropriate Transport Capacity. The Driver 13 is automatically guided to the pick-up point, optimally through the Sat Nav Tracker 17 display unit with verbal instructions. A Driver Software Interface determines if the Driver 13 is complying with the pick-up request, optimally based off the vehicle's movement and a period of time for the Driver 13 to automatically accept or deny the request ("Reserved Capacity").

In the event that the Rider 10 does not have a Rider Software Interface, the Rider can receive/respond to a message of available capacity via the means most conveniently appropriate to them (i.e., verbally, via text message, selecting at the Internet web site, and the like).

Confirmation is then sent to the Rider 10 via a message which optionally directs Rider to an alternate nearby optimal Pick-up Point in order to maximize transport efficiency. For example, if the Rider made a request on an infrequently used street, the Rider may be directed to walk a block or two to a Pick-up Point where Transport Capacity is available.

At any time up to the proximity alert warning period ("Three Minute Warning"), the Shared Transport Marketplace 12 will be working to optimize available capacity and services and will substitute Riders and Drivers, create multiple Riders at the same Pick-up Point to fill the Transport Capacity more efficiently, and the like. The Shared Transport Marketplace 12 will also monitor the Transport Capacity to see if any new capacity has become available which offers a superior service and/or a lower price option to the Rider 10 (for example, if capacity is introduced which reduces the number of transfers necessary).

At the time of the Three Minute Warning, a message is sent to the Driver Software Interface and the Rider(s) with the information pertinent to the pick-up destination and the Riders. The Driver Software Interface then guides the Driver, optimally through audible cues, directly to the Pick-up Point.

At the time when the Rider needs to be in queue ("One Minute Warning"), the Shared Transport Marketplace will optimally automatically confirm from the Rider's GPS Phone 11 that the Rider is positioned within a certain proximity to the Pick-up Point ("Reasonable Rider Proximity"). If the Rider is not within Reasonable Rider Proximity, the Demand Route request is rescheduled and the Driver is informed that the Rider is not available ("Rider No Show").

At or before the One Minute Warning Time, a message would optimally be sent to indicate to the Rider to be on the lookout for the Transport Capacity, along with the specific color, model, picture and/or other identifying characteristics of the transport capacity that was arriving. If necessary, the Rider would also be provided with a PIN to verify their identity and booking.

Communications between the Sat Nav Tracker 17 and the communications network or the GPS Phone 11 can be accomplished from any one or a combination of a variety of direct or indirect data communications networks, including commonly used wide area networks such as GPRS, 3G, and other cellular communications traffic; 802.11 Wifi or Bluetooth or other similar local data communications networks (in conjunction with, relayed and/or proxied by longer range communications networks as necessary), and other wide area networking techniques such as WiMax and other technologies that will be introduced in the marketplace from time to time.

Referring to FIG. 7, rider transactions and events are logged by the Shared Transport Marketplace (see elements 702, 704, 706, 707, 709), and if a disproportionately high percentage of Rider Demand Route requests result in Rider No Shows (for example, more than 1 out of 10) ("Unreliable Rider"), then the Rider 10 is tested for Reasonable Rider Proximity at earlier times, such as the Three Minute Warning period, and the Driver 13 will not be notified to pick-up this class of Unreliable Rider, unless the Unreliable Rider is already at the Pick-up Point, until such time as Rider No Shows passes a standard reliability as approved by the Shared Transport Marketplace.

Likewise, as illustrated in FIG. 7, a History for Driver transactions is logged by the Shared Transport Marketplace 12 (see elements 702, 704, 705, 708, 709). If the Rider 10 is waiting at the Pick-up Point and for whatever reason the Driver 13 does not pick up the Rider 10 ("Driver No Show") and/or is consistently late in picking up Riders, the Driver 13 would be measured for timeliness and Driver No Show rating ("Unreliable Driver"). Such lateness should include reasonable adjustments for consistently gridlocked locations such as city centers, as would be indicated through stochastic measurement of other Driver performance at the same Pick-up Point. The Driver 13 would likewise be expected to measure up to a higher level of performance to overcome an earlier unreliability, or the Driver 13 would be ranked lower ("Star Ratings"), matched less frequently, and/or possibly expelled from the Shared Transport Marketplace 12.

Although Riders/Drivers remain anonymous, system rankings are available, and Riders have the ability to only request Transport Capacity from Drivers with specified quality Star Ratings, and the like.

Transport Capacity optimally would have an external indicator ("Route ID Display"), optimally a bright display that is about the size and position of the passenger's side sun visor in a car, preferably mounted on the interior of the car, that optimally presents a visual confirmation of the route identification to the external Rider, so that as the Transport Capacity approaches, the Rider can begin approaching the Transport Capacity. While this Route ID 18 is somewhat analogous to the function served by a Bus Route Information display, the Route ID Display 18 has the following additional functions more necessary for a point-to-point, rider-by-rider shared transport network: Route ID Display 18 can be triggered automatically to become visually distinctive as it approaches a Rider Pick-up Point (analogous to the flashing lights of a School Bus as it stops to pick up children). As there could be hundreds of vehicles on the road that also provide Transport Capacity, this distinctive display serves the unique function of distinguishing the Dispatched Transport Capacity which has been matched to the Demand Route from other Transport Capacity which may be on the same road at the same time. In a low-tech, lower function incarnation, this could simply be a placard sticker with a fixed ID number.

As the Transport Capacity comes within a viewable distance ("50 meter display"), the Route ID Display 18 could show the particular Demand Route information and/or other Identification information (Personalized Route ID Information), for example, the readable distance ("20 meter display"), the Route ID Display could show the particular Demand Route information and/or other Identification information (Personalized Route ID Information), for example, the Nickname(s) of the Rider(s) being picked up, the Destination Point(s) of the Demand Route(s), and the like.

As Transport Capacity approaches the Pick-up Point, the Driver would position the vehicle at the Pick-up Point, and optimally the Driver would be presented with a picture of the Rider(s) and the identification name of each Rider ("Nickname"). If the Rider does not match their picture, the Driver would choose to refuse the shared ride, and would submit, through the Driver Software Interface, the reason for denying the ride. (At this point, an operator of the Shared Transport Marketplace 12 would attempt to contact the Rider through the information provided with their registration details to see if there was a human error or to see if the Rider's GPS Phone had been stolen, in order to disable future Shared Transport Services). If a PIN were provided to the Rider, the Rider would be prompted by the driver to enter the PIN (or the driver would enter it himself), and the match would thus be verified, or the match could also be verified through the method of Continuous Co-ordinated Proximity, described below.

Upon a match-up of Rider 10 and Driver 13, Rider would enter the Transport Capacity vehicle ("In Process Journey"). The Shared Transport Marketplace 12 would then optimally verify, through the location information in the Sat Nav Tracker 17 and in the GPS Phone 11, that the Rider and Driver were indeed at the same location.

If the Driver 13 left the Pick-up Point area without picking up the Rider 10 (the Shared Transport Marketplace 12 could know this due to the divergence in location information between the GPS Phone 11 and the Sat Nav Tracker 17, as shown in FIGS. 10a, 10b, 11a and 11b), the Shared Transport Marketplace 12 could send messages to the Driver 13 and Rider 10 verifying that this was their intent; for example, if the Rider 10 had suddenly changed their mind, perhaps to go back to their house to get their umbrella. However, if the Demand Route was still needed, the Rider 10 and Driver 13 would be queried on their next action; for example, if the Rider wished to re-submit their Transport Demand request. In that case, the Rider's request would receive higher prioritization in the event there is a queue of Riders at the same location, so that the Rider would not have to return to the end of the queue.

When the Driver 13 approached the Rider Destination, and possibly at points along the way, the Rider 10 and Driver 13 could be polled for their location information to verify that the ride was progressing ("Continuous Co-ordinated Proximity" elements and methods of which are illustrated in FIGS. 10a and 10b). Processing and communications could be done either locally (using software inside the Transport Capacity vehicle, in Driver Software Interface and Rider Software Interface, and communicating via near-field communications inside the Transport Capacity vehicle using software in Driver Software Interface and Rider Software Interface, via communications technologies such as Bluetooth, 802.11, RFID or their equivalents) or via network polling to Sat Nav Tracker 17 or GPS Phone 11, or a similar combination of methods and communications. The delivery of the transport service could be proven beyond a reasonable doubt through the continuous co-ordinated proximity between the Driver and the Rider according to the verification of simultaneous geographic proximity as illustrated in FIG. 10b. At the end of this journey, a message would be send to Rider with the details and any billing information about the journey.

An alternative method of verification of continuously co-ordinated proximity would be to use the establishment and continuance of near-field communications as the primary consideration for determining start point of ride sharing experience, and use the breaking of this near-field communications between the Sat Nav Tracker 17 and the GPS Phone 11 (in cases other than power-off or reset of devices) to establish the verified termination point of the journey. The elements involved in this method are shown in FIG. 11a, with the methodology shown in FIG. 11b.

Alternately, in a low-tech (and only partially verifiable) implementation of the above, the verification of the Rider pick-up and delivery could be accomplished through the use of a PIN transmitted to the Rider, the entry of that PIN by the driver, and a lack of negative confirmation when the Rider is presented with the journey summary information.

Important aspects of the above system that were not mentioned in the above narrative: Trusted Drivers and Trusted Riders are a large part of the viability of any Shared Transport System. In order to improve on the quality of this trust, and to provide security assurance to Riders and Drivers, certain behaviors would prompt alert conditions, especially those related to security or safety. For example, when a Transport Demand is established which results in an In-Process Journey which is terminated before or at a different point than the established Destination Point, this information is logged and could further be used to generate, for example, automated phone calls to verify the intent of the Rider & Driver, including prompting the Rider or Driver for verification of pass codes ("Favorite Color") which would be established upon user registration. If a Rider or Driver was unable to verify their Favorite Color, human intervention and responses and queries (from Network Operators, optimally, at a Network Operations Center (15), as shown in FIG. 1) could escalate the situation response as appropriate, even initiating vehicle tracking and dispatching security personnel if appropriate.

Other methods of assuring that the Shared Transport System developed and maintained good social and safety standards would be a comprehensive ratings system. At the end of each journey, as the Rider leaves the vehicle, they are messaged with the details and cost of their journey on their GPS phone 11 (via SMS, e-mail, or via a special application or web page, for example). This message also could prompt the Rider to rate the Driver, for example, with 1 to 5 stars, on one or more scales (safety, comfort, social factors). A sufficiently low rating (for example, 1 star), could be used to automatically "blacklist" that Rider from ever matching with the Driver again (using the Matching Engine 701, as shown in FIG. 7, in conjunction with the rating systems of the Transport Provider Management System 705 and the Transport User Management System 706).

Likewise, at the end of the driver's journey, as they stop their vehicle, they would be automatically prompted to rate the Rider(s) that they had carried on their Supply Route. Using the same or similar criteria, they would provide their feedback to the system about the rider. A sufficiently low rating would probably also prompt more requests for information, such as why the rating was so low.

Such an automatic feedback system would help police the network for bad behavior and thus encourage more responsible behavior on the part of everyone using the network.

The network system may also be provided with the following capabilities.

Real-Time Self-Correcting Network Redundancy Elimination

System feedback, in real-time, to a driver that another public vehicle or Shared Transport vehicle is available within set criteria (ie., with destination <¼ mile of theirs, with 0 or 1 transfers, with maximum of a 5 minute wait). If interested, the driver would receive the location/directions to a car park that is in-route.

Period Benefit Cost/Time Analysis

System log periodically (weekly/monthly, for example) compares transit network availability with actual usage data from an in-car navigational unit and provides a trip-by-trip summary of which trips would have benefited through use of the Shared Transport Marketplace, what the cost/time savings would have been if the user had dropped their car at a Park & Ride; also, what the EARNINGS would have been if the user had picked up available fares (plus/minus 5 minutes); also, generic trip data about the average speed, journey time, $CO_2$ generated and gas consumed.

Additionally, network capacity demand can be used to calculate any possible public subsidy or tax credit benefit that can be awarded to potential drivers in exchange for their availability on their normal transit routes.

Identity Verification System

Personal communications device could show the picture and name identification of the driver responding to pickup request.

Service Provider (Driver) display shows the picture of the Rider 10 (service requester in case of cargo or concierge) requesting pickup service.

Rider/Driver Proxy Messaging System

Normally Riders and Drivers would have no need or use for contacting each other directly; however, there could be a few circumstances where it would be useful for one to contact the other, such as in the event of a lost or found item in a car, or perhaps in certain rare cases where they need to reach each other to arrange exact transport details. Normally these users of the system may desire to keep their contact details and full identity information (such as name, e-mail or phone number) private.

FIG. 13 shows a message proxy system that would enable communications between members of the community without losing this identity, and also, importantly, disabling any inappropriate content or contact between community members as well as adjusting the rating of any community member as necessary.

In normal usage, the system would function as illustrated in FIG. 13. For example, if a Driver 13 identifies lost items left in their vehicle, they could choose a function on the in-vehicle device (or via a web page), to send a message to the Rider 10. The system 12 would then receive this message 131, evaluate the content for appropriate content 132, and if it could automatically determine this, would redirect the message 134 on to the Rider 10, coding the message with a unique identifier so that it would know to respond to the Driver 13 if the Rider 10 responds. If the system could not automatically approve the content of the message, the operator would review the content 136, and if the content was OK, the message would be passed on, but if not, the message would be rejected 138 and the Driver may receive a rating adjustment 137 and message to reflect the inappropriate use of the system. If the Driver's misuse of the system was sufficiently untrustworthy, the operator may choose to restrict the Driver's messaging capabilities, blacklist the Driver 13 for future matches with this Rider 10, or make other adjustments to the Driver's ratings.

The network could generate near real-time messages using SMS, e-mail, or voice messages for example, or could, using a similar technique, proxy a phone call if desired and appropriate.

Friends & Family Transit Network

Riders and Drivers can restrict Transport Capacity and Transport Demand matches to operate only inside closed communities of members, if desired. Such closed communities could be, for example, employees of a company, students and parents at a given school, or membership in a given social or sports association. These closed communities could be defined inside the various interfaces available as part of the Shared Transport Marketplace 12, including web pages, or could in fact be authenticated from other means, such as all those members of the Shared Transport Marketplace who had e-mail addresses ending in @mycompany.com or @myuniversity.edu.

The Network System could also allows users to tag drivers or riders as "friends and family" post ride, over the web in displays of private network drivers, or through e-mail opt-in.

Existing internet social communities could be used to instantly pre-populate the social communities that the user would want to make their Transport Capacity or Transport Demand known to, to help advertise and expand the reach of the Shared Transport network, or to match exclusively, or preferably, within the social community.

These "friends & family" designations would become part of the criteria used to rank available drivers and riders, where the rider or driver has a preference. Similarly, a rider or driver can tag the other as "not again", which could rank these alternatives lower or completely "blacklist" a Rider or Driver from matching directly with each other in the future.

Scheduled Rides Confirmation

For rides which are pre-scheduled, software on the user device or through the network software will offer periodic warnings and require confirmation from a Rider a preset advance notification time (say 15 minutes) in advance of pickup, then again a preset nearby notification time (say three minutes) before pickup. The Rider has the option to delay or cancel pickup. The Driver is not routed off course or dispatch information sent until and unless rider confirms such pre-scheduled intent.

Advantages of Shared Transport System and Service Network

The invention thus provides a system that has the following advantages which have benefits to the area of public transport:

A. A matching system for transportation capacity with transportation demand. The System maintains a matrix of journey time and cost estimates for the nodes (pick-up and drop-off points). Next available capacity, and estimated travel time between each of these nodes is maintained.

B. A characterization method for summarizing transport capacity for individual drivers. Vehicles delivering transport services to commuters (trains, buses, planes) have long used the characterization of "stops" to summarize their transport network services in a way that the consumer could relate to (for example, the #6 subway line, stopping at $34^{th}$ St, Grand Central Station, $49^{th}$ St, etc. However, for an individual driver on their personal daily commute, the typical characterization of a route is the start and end address. This characterization makes the matching of a driver journey difficult for a passenger. The introduction of computers or GPS systems to the problem doesn't necessarily make the solution any easier, as computers and GPS systems will often just reduce an address down to its geographic co-ordinates (latitude/longitude), or represent a drivers' route as a stream of latitude/longitude points.

The system herein described provides an automatic way of converting the computer's representation of a driver's route into a format which is more usable for further analysis and presentation. FIG. 8a graphically illustrates an example driver's journey from their work location (Parnell Place, in City Center 802) to their home location (Kinsale 803, in the rural areas). The GPS unit of a car, when recording (or calculating) the driver's exact route, would represent this journey as a a set of co-ordinates. However, for the purposes of establishing a shared transport network, it is useful to establish a network of pick-up and drop-off points (nodes), so that Riders and Drivers can be guided to places that are safe and convenient and comfortable for both the Riders and Drivers. This network of stops can, for example, be pregenerated from existing databases of stops from existing bus networks, entered using traditional GIS systems, or in fact created by the in-vehicle system 17.

The route of the driver's journey is shown in FIG. 8*a* as a dark line (801) moving from the north of the map towards the south of the map. The system calculates the places where the route of this line intersects a stop node, and thus can present the journey at the end of the route in the format of a very useful and concise set of major stops, rather than an incomprehensible list of addresses or geographic co-ordinates. For example, the driver's route 801 can automatically indicate that the path of this route is from Parnell Place 802 to Cork Airport 804 to Farmer's Cross 805.

Furthermore, once the geographic representation is abstracted to stop nodes, it is possible to show the driver's route in a variety of alternate presentations, such as the presentation shown in FIG. 8*b*. Here, we see the journey described with an abstraction of the journey start and end-points 811, where the start point is characterized by the town name; and we see a graphical presentation of boxes summarizing activity at each stop along the journey; and we can also see a level of characterizations. A busy city route may actually have many dozens of stops it could theoretically stop on if there were people waiting at the stop, but perhaps only the most major stops (as coded separately using operator intervention or data entry, for example) would be shown in order to present the information more clearly, The major stops of a route, as shown in 817, may not necessarily even include the start point or end point if they are not where the likely traffic would be, for example.

As shown in the elapsed time between stops 816, it becomes manageable to represent travel times between nodes using driver's journeys when organized as a stream of stop nodes. Likewise, stop nodes makes it easier to characterize capacity and frequency of travel between locations.

As graphically illustrated in FIG. 9*a*, using the automatically generated driver's stop nodes to measure and predict capacity, it is also possible to show the real-time transport capacity of the shared transport network, and/or the predicted capacity from the stochastic transport capacity network model. This particular representation shows the same network model as FIG. 8*a*, but trimmed to only show those segments and nodes in the network that have active transport capacity on them at the time the user displays the model. This method of graphically presenting the reach of the transport network dramatically improves the confidence that a user would have in the shared transport model, knowing that they can get from one place to another, and knowing, through the stochastic model, what the availability would be at a different time of day.

Traditional transport networks have known this for a long time, of course, and so maps of network capacity have long been available on public transport systems, although they have not yet been applied usefully to carpooling systems or this invention of public shared transport. Traditional public transport networks have also sought to make their transport more understandable by simplifying the geographic maps into quasi-geographic schematic representations that enhance readability and information display by distorting the geographic accuracy in certain manners (using only orthogonal and diagonal lines, for example). The system could generate schematic maps automatically (several such programs and techniques are known in academia) using as its source the dynamically created transport network as generated by the real time and/or stochastic shared transport node model. An example of this schematization of a shared transport network is shown in FIG. 9*b*, using the model of the 9*a* network.

C. An active monitoring system for generation of usage/demand data for point-to-point routing of participating vehicles. The system looks for overlaps of capacity and seeks to eliminate redundant capacity (within certain distance criteria, transfers criteria and timing criteria) by suggesting route changes or route termination. For example, if five cars were on the route to the same destination, the system could inform the cars that the quality of shared transport service on their route was high, and could suggest that one or more cars pull over into a Park & Ride (for the Driver to become a Rider in another vehicle's car, as it would be far more economical than driving himself in a single occupancy vehicle to the same destination). Alternately, this monitoring system's data reporting and analysis can be used to suggest the generation of new routes, or on-the-fly routes, for public transport when enough demand capacity exists to create transport routes which bypass crowded city centers or, minimally, can skip stops on an existing route (generating express routes by selecting appropriate Riders to get on the transport capacity).

D. An active monitoring system for generation of traffic flow data; combined with a central information repository, gives real time network for traffic flow throughout a metropolitan area. The system as described has the capability to enable any of the Transport Capacity vehicles to act as "traffic probes", reporting on throughput and delays in traffic. The system would use this data internally in order to better predict arrival time of Transport Capacity at the Rider's Pick-up Point, but this data could also be shared with the general transport community at large as a substitute for other means that they may normally use to determine road traffic (loop detectors, video cameras, traffic probes, etc).

E. A system to generate matches between route capacity and timing and Transport Demands, from usage data. Regular traffic between nodes and subsets of nodes is gathered by this system continually (FIG. 7, elements 709, 710, 711, 712), The system 12 can thus tell a user who wishes to go from one point to the next how to best get there using the available transport capacity via it's matching engine (element 701).

A graphic illustration is shown in FIG. 14*a*. In this case, a Transport User 1401 wants to go from the departure point 1406 to the arrival location 1409. Active Transport Capacity 1402 and 1403 both pass by 1406 (as known by the system by the declaration of their Supply Routes. Whereas Transport Capacity 1402 has registered a route of 1405, 1406, 1407, 1408, Transport Capacity 1403 has registered a route of 1410, 1404, 1406, 1407, 1408, 1409. All other considerations being equal, the matching engine 701 would thus match the transport request between stop 1406 and stop 1409 using Transport Capacity 1403.

As other vehicles regularly travel between the nodes 1410, 1404, 1406 and 1409 at this time of day and day of week, the system would be able to reliably calculate how much time will elapse until the vehicle has arrived at the Transport User 1401's pick-up point, and would start the notification processes as detailed in the system appropriately. The system could also tell the Transport User 1401 at what time they would arrive at their destination 1409.

If Transport Capacity 1403 did not make their service available to Transport User 1401, the geographic scope of the search could be widened and the User could be alerted that an option exists that would get them to a drop-off location 1408 rather than the desired 1409 drop-off location, and the user could choose to accept this transport instead.

As illustrated in FIG. 4, Transport Capacity and Transport Demand will have a variety of providers (402) and users (403), with a potentially complex set of requirements and preferences (404, 405). The matching engine (401) provides the Transport User with a means to display and/or automatically book the best options available.

F. Display methods to show available transport capacity and options to Transport Users. While no working system currently exists for the kind of real-time shared transport envisioned by this invention, the closest computing systems that perform a similar function are those car-sharing or carpooling schemes which attempt to match riders by destination and origin, for the purpose of establishing one-time or regular commuting matches. A major weakness of current state-of-the-art systems for carpooling is the limited representational capability of these systems, as it is usually difficult to find if there are any services on offer in a given neighborhood or area, to a given neighborhood or area. Current state of the art systems assume that no transfers are possible between shared transport providers or public transport, and work best when all of the users of the system have a common shared destination or origin (for example, commuters to a given campus, students at a university, or (when trips are to be made across country), members of a given urban area). The present system, however, generates a number of representations of transport capacity which will give encouragement to transport users and providers that service is possible using the present system.

From the live usage data of the system, maps can be presented which show the real-time capacity of the system. As graphically presented in FIG. 14a, live maps could be displayed which show the real time transport capacity of the network and the stops in the network. However, these maps by themselves do not provide a sufficient quality of information to give confidence in the likelihood of a user being able to get from their start point (1406) to their destination point (1409). FIG. 14b demonstrates a more useful presentation of the street network, which begins to inform a user how they would use the shared transport network to reach their chosen destination, or what kind of service availability they would have using the system.

Until a certain critical mass is achieved in a given geography, transfers to non-commercial private transport vehicles will be limited, and so it is important to also be able to show representations of the transport system showing all possible destinations where no transfers are necessary. This is graphically illustrated in FIG. 14c.

G. A prediction system to generate available route capacity and timing from summary usage data. Traffic data is essentially stochastic, and therefore this system provides predictions of transport capacity between points in a way that can be useful to transport users in matching their transport needs and in providing them with useful information that makes them grow to trust the system and make better transport decisions. Because the nature of this system is extremely ad-hoc, few bookings will be matched far in advance for a specific transport capacity. The best capacity for the journey is the capacity flowing by the transport user as they need it. While this approach enables a large number of advantages, the central weakness to this approach is in the uncertainty of a booking, both in terms of its timing and the provider of the service. Therefore, it is particularly important that this system provide excellent information services which overcome these uncertainties.

As mentioned above, usage data for this system is continually gathered. Beyond the use of this real-time information for the benefit of matching is the categorization of this usage data into a transport model (FIG. 7, items 701, 702, and 702). This transport model would contain day part information for traffic capacity flows. Thus, even if a transport demand were made that did not currently have transport capacity available, the model would be able to stochastically determine the likelihood of service, at any part of the day. This is graphically depicted in FIG. 14d, where the historical availability of transport capacity is represented by lines in the street network. Of course, instead of using a street map presentation of wait times or capacity, a logical schematic of the network amongst transport stops could also be formatted to similarly display timeliness and throughput. As shown (1434), the map or schematic could be shown for any day or time period.

In many uses, of course, a tabular representation is preferable and augments the understanding of a network, and from the generated capacity model, tables such as that presented in FIG. 14g would be generated to approximate the appearance of timetable schedules of traditional transport providers, such as city bus or subway networks. These timetables would of course be based off the ad-hoc transport capacity as driven by transport providers over time. These forms of definitive and statistically useful information will help transport users gain the confidence in the viability of shared transport, as well as be aware of better options that they may want to consider. For example, referencing the combination of FIG. 14g for tabular data and FIG. 14e for graphical presentation of a given transport user 1449, we can see that the tabular presentation shows that from the start point 1471 of the transport user (1441 on the map), to the destination point 1472 (1442 on the map), the general availability would be better at location 1443 (1473), where the average waiting period 1475 being less than that at location 1444 (1474). However, for the most common commuting hours (7:30-10 am and 4:30-7 pm), the availability is similar.

Of course, in some cases drivers could be guided off their normal route to pick up passengers, and the system would be capable of doing that, but in most cases, it would be more desirable to pick up passengers without inconveniencing or disorienting the driver.

It can be readily appreciated how the availability of this information would enable users to make better commuting choices. In the table shown in FIG. 14g, only two stops were shown and the rows were broken up by time of day and subdivided by stop; naturally, this information could be extended if desired into a larger array, or shown in a format of stops as columns, stops as rows with cells displaying average frequencies; or other typical timetable schedules.

The directionality of the transport traffic is also a major factor in the display of this stochastic information, and as shown in FIG. 14e, the reverse route for a commuter transport user 1441 when returning home could appear very different graphically, depending on transport capacity usage history, from the opposite direction. FIG. 14e also shows how a combination of historical data plus real-time data can be used to provide a blend of information to the transport user. This presentation of a blend of statistically generated timetables as well as real-time presentation of capacity would also be essential to the operations center staff in helping transport users understand their options as well as influencing any marketing or operations plans they would have to expand the network, and could also be used to help determine automatically if there are any unusual activities such as road closings or traffic jams, where the historical data and the real-time data varied significantly.

Using this system it can be extremely useful to display the combination of statistical transport models with real-time information in tabular format. FIG. 14h graphically illustrates one form of a "departure board" for a shared transport network. Departure boards, as seen often in airports, train stations and other transport hubs, provide the answer to the question "where can I go from here?".

Shared transport would provide a new opportunity for departure boards to be used in corporate campuses, lobbies, and other places where public transport has traditionally underserved the population. Shared transport departure boards could combine public transport information, private shuttle services, and shared transport services. While a preferred form of a departure board would be a separate physical display, it is of course possible to have departure boards take the form of web pages, a frame within web pages, or special "widget/gadget" style small programs that people could run on their portable phones or personal computing devices.

However, in the case where the transport service is not provided by scheduled services, the provision of a statistical transport model in conjunction with a real-time network is essential to providing this information, particularly in cases where the transport is leaving from within a campus (or housing subdivision) and moving out of range quickly. In a case where 15 vehicles leave a subdivision and head to a city center between the hours of 7:30 and 8:00 am daily, it could be approximated that one vehicle moves between this journey's start and end points once every two minutes.

Consider again FIG. 14e, where a transport user 1449 would like to find out what the availability of capacity is between start point 1441 and destination point 1442. Some transport capacity 1448 is positioned in a parking garage near the city center and also intends to go to destination 1442. As the transport capacity 1448 turns on their vehicle, they may only be within the area close to start point 1441 for a minute and two. As a result, if most of the transport capacity were coming from similar location, the transport user 1449 may not see the possible destinations until a few moments before they became available for matching, if at all.

As departure boards also serve the function of advertising the availability of transport options, the shared transport departure board would be under-representing the possible answers to the question "where can I go from here?" unless it includes a statistical model in the presentation of the departure board. FIG. 14h shows a table combining real time network information with statistical network information. Here, FIG. 14h is a tabular representation of FIG. 14e, and the transport user 1449 wants to go from 1441/1481 to 1442/1482, Estimated departure times 1485 show two forms of numbers, perhaps graphically displayed with different characteristics, with real-time information for actual vehicles shown as indicated in 1486 and statistically established timing shown as in 1487.

Note also the departure board format would display major intermediate journey nodes 1488, as discussed above and calculated and characterized automatically by the system. Oftentimes, an end destination 1485 is not known by a viewer, and the intermediate points 1488 are the points of interest. As the purpose of the departure board is to improve the perception and communication of transport options, the characterization of the path of stops, described above in the description of FIGS. 8a and 8b, further improves the transport user's information experience.

H. A journey planner for a shared transport network. Journey Planners, which show best available routes between start point 1491 and destination point 1492 as well as cost and schedule information, are a well-known concept for public transport, but have not been used to describe non-scheduled transport services. As shown in FIG. 14i, the Journey Planner would operate similarly to existing public transport network journey planners, but would also incorporate the statistical model of available shared transport 1495, and real-time shared transport information to provide best possible combinations between 1493, 1494 to provide the user with the widest range of useful options.

I. As the Shared Transport network expands, more transport capacity will become available regularly on certain routes. The system as described would be fully aware of which routes have underutilized capacity, and would also be aware of transport users previously registered transport demands. Whereas normal public transport networks don't appear to have any awareness of who is using their services, the present system would communicate with its transport users to let them know about expanded hours of quality service (for example, less than 10 minute wait for services), and/or expansions of service into new outlying areas for that user, etc.

J. Governmental agencies and local authorities have long sought to encourage the use of carpooling, using incentives such as HOV (high occupancy vehicle) lanes, discounted tolls, and tax deductions for the use of public transport means. In the near future it is anticipated that further incentives may be brought to bear, given the extreme shortages of oil which are expected in the years of 2011 and beyond, as well as the increased awareness of global warming. In addition, companies and organizations who are pressed for parking spaces are highly motivated to try to get their workers to carpool, and sometimes provide free or premium location car parking spaces to those who carpool. To increase the effectiveness and efficiency and compliance with these measures, it is anticipated that automated means may be desirable to authenticate the use of the vehicle in shared transport applications, as shown in FIG. 12a.

In this access control system, a vehicle 1209 would approach an "access gate" 1208, for example, a toll booth 1204 or a parking lot access gate 1206. Whether the system was a server push or client pull system (FIG. 12b, FIG. 12c, FIG. 12d, or Fib 12e), the information about the Shared Transport status and business rules would be processed at the Access Server 1207, and, if access was permissible, the gate 1208 would be lifted, allowing free or discounted access to the resources of the company or governmental agency. In fact, no gate 1208 would necessarily be required, as the system could be a tolling system which simply charges a different rate depending on the occupancy of the car, etc.

Throughout the year that the car is used, the usage of the car could be measured in terms of the percentage of time it was used for shared transport, and this could, if it passed a certain threshold, qualify the transport provider to benefit from certain tax benefits, carbon credits, and the like.

K. A trust system for managing networks of Transport Providers with varying trust characteristics. As shown in FIG. 7, the Transport Providers/Drivers are managed by a system 705 which considers their ratings (as provided to the system by an Activity and Event Manager 702) and their community memberships 713. This enables, as shown in FIG. 4, the Matching Engine 401 to consider matching transport demands with a variety of Transport Providers 402 and Provider criteria 404.

L. A self-correcting trust system for feedback of Rider response to Driver performance. As shown in FIG. 7, when a Journey has been matched between a Transport Provider 720 (Driver) and a Transport User 721 (Rider), the Journey is actively managed by the system 704. As part of this process, the Rider is prompted to provide a measurement of trustability to the Driver. This event 702 is then passed on to the self-correcting trust system within the Transport Provider Data Management system 705.

M. A self-correcting trust system for managing Driver preferences of various Riders. Likewise, as shown in FIG. 7, the Transport Provider is prompted to provide a measurement of trustability to the Transport User. This event 702 is then passed on to the self-correcting trust system within the Transport User Data Management system 706.

N. A modification of the above system to allow it to be used to transport goods and merchandise by having the Transport User send packages instead of using the system for personal transport, but otherwise using a similar Shared Transport Marketplace for matching transport need and rating of providers.

O. The Driver can also be driving a bus (whether a private or public transport service), a taxi, and the like.

Referring to FIG. 2, the transport capacity computing and communications components of the network system include components for (1) location and direction, many of which can supplement the locational accuracy where GPS technology is not functional or is less desired (for example, underground transport forms would be more likely to use fixed position "markers" to determine the location of the transport capacity, and in the same underground transport situation, the GPS Phone would ideally be equipped with 802.11b technology and a reference database of positional location of underground wireless 802.11b or similar local wireless networking broadcasting devices in order to determine location and facilitate data communications); (2) Far-field communications list some of the communications methods used to facilitate interaction with the Shared Transport Marketplace, including the possibility of using voice or IVR interaction with a system operator rather than data networking; (3) Near-field communications detail methods would could be used to communicate between Rider and Driver computing/communication devices (preferred in order to reduce data congestion and airtime charges); (4) supply routes include those information sources and database of commonly used and widely known location names that will feed the Shared Transport Marketplace with available and potentially available transport capacity from the Driver and public transport sources; and (5) Demand route, which includes several possible methods of requesting a route by a Rider. The devices and inputs used by each of these five components are as listed.

Referring to FIG. 3, the rider technology components of the network system include components for (1) Location, that is, several methods for determining the exact position of the Rider for communication to the Shared Transport Marketplace; (2) Location transmission, that is, the interface that the Rider uses to transmit his Demand Request; (3) Computing Component, that is, the device that the Rider uses to transmit his Demand Request; (4) Internet, that is, either the broad Internet or a limited Intranet which enables the data transmissions between the Shared Transport Marketplace and the Rider; and (5) Demand Route, which includes many of the databases and the pricing and membership models which enable a given Rider to take advantage of a variety of possible types of Transport Capacity. In addition, the devices and inputs used by each of these five components are as listed.

Referring to FIG. 4, the multiple uses and operations of the network system are shown graphically and include components for (1) Supply Side Routes, which include the databases of providers of shared transport services, (2) Demand Side Routes 407, which include a subset of possible methods for a Transport User 403 to request a Route, (3) Request Methods 408 and Availability Methods 406, which include a variety of methods which could be used to communicate between the Rider, Driver, and the network system. The Matching Engine 401 would consider the availability of transport capacity, provider criteria 404 and transport demand criteria 405 in providing ideal matches for the request.

Referring to FIG. 5*a*, the experience of a rider in using the network system are shown as a flowchart and are believed to be self-explanatory, as they have been described in text above. Use of specific references to time, ie., "Three Minute Confirmation", are completely configurable by the user and would be changed either automatically or manually to reflect different modes of transport and interchange or uses of the general system The accompanying table, FIG. 5*b*, provides further specifics on data and usage of the functions in the flowchart of FIG. 5*a*. The experiences may stored in memory and printed out.

Referring to FIG. 6*a*, the experiences of a Driver in using the network system is shown as a flowchart and are believed to be self-explanatory, as they have been described in the text above. The experiences may stored in memory and printed out. The accompanying table, FIG. 6*b*, provides further specifics on data and usage of the functions in the flowchart of FIG. 6*a*.

Referring to FIG. 7, the Shared Transport Marketplace will be composed of a number of computer servers networked together to perform the data and communications functions as specified. Communications interfaces 723 will enable the system to communicate automatically between other automated computer systems, to individuals via computer interfaces, to individuals via telephonic interfaces, Sat-nav units, and the like.

Continuous Co-Ordinated Proximity System

In order to improve the user experience and the rapidity of verification of transport user ID and thus reduce the delay of loading people or goods into a transport vehicle, it would be desirable to have means to quickly verify the identity of the transport user for the transport provider, in order to know that the passenger is a paying and trustable passenger, as well as to confirm the drop-off location of the transport user.

Referring to FIG. 10*a*, the elements necessary to determine if there exists continuous co-ordinated proximity are the monitoring and verification system 1001, a Transport User Device 1002 and a Transport Provider Device 1003. Each of the devices 1002 and 1003 would need to have a means to determine their location. Additionally, for the "independent verification" method, there would need to be far-range data communication means 1005 and 1006. Optionally, there can also be communications between the devices 1002 & 1003 via a far-range or near-field data communications means.

Referring to FIG. 10*b*, the logic necessary for a central server to determine if there exists continuous co-ordinated proximity by the method of independent verification is shown in the flowchart.

Referring to FIG. 11*a*, the elements necessary to determine if there exists continuous co-ordinated proximity via verification of near-field communications link are the the monitoring and verification system 1101, a Transport User Device 1102 and a Transport Provider Device 1103. Additionally, for this "near-field communications verification" method, there would be near-field data communication means 1104 between devices 1102 & 1103. Optionally, there can also be communications between one or more of the devices 1102 & 1103 via a far-range communications means 1105 or 1106. In the near-field communications method, one or more of the devices 1102 and 1103 need to have a means to determine location. The logic for the determination of continuous proximity, as shown in FIG. 11*b*, would run on either device 1102 or 1103, though more likely on the Transport Provider device 1103. The communications with the Monitoring and Verification system 1101 would be between the device running the logic as shown in FIG. 11*b*. In the event that the data does not need to be communicated real-time, or in service areas where there isn't continuous data communications capacity, the logic system could cache the start and end positions of the transport service between devices 1102 and 1103, or a plurality of other such transport services, and when the logic system does come into networking contact of Monitoring system 1101, the entire cache could then be transmitted.

Using such a cache system would have the following benefits: reducing the data communications expenses by sending less transmissions, increasing the areas of service to include those areas where data communications is unavailable, and, where no far-field communications are needed at all, reducing the hardware requirements of a continuous co-ordinated proximity service. In this case, the transport provider would have to, perhaps daily, come in contact with a near-field communications network.

Hardware and Software Components

Transport User Device

Optimally, a GPS phone with an ability to display graphics, serving the primary functions of enabling Transport User to book travel, receive updates on travel information, confirm bookings and receive activity receipts, provide proof of identity and location, as well as update trust ratings on providers in the network.

Transport Provider Device

Minimally, a GPS phone with an ability to display graphics. Optimally, a personal navigation device or built-in sat-nav unit, serving the primary functions of enabling transport provider to advertise spare transport capacity, route the driver to pick-up locations, confirm or cancel bookings, provide proof of identity and location, update trust ratings on transport users and suitability of geographic locations.

Network Operations Center

Computers and Display systems networked to the Shared Transit Marketplace Server, with telecommunications capacity for call center and operations staff, serving the primary functions of enabling the booking of travel and conveyance of information about network services, customer inquiries, management of physical and logical and transportation network capacity and organization, and the business management of transport operations.

Shared Transit Marketplace Server

A network of computers attached to the Internet and telecommunications services. Providing automated functions for the Network Operations Center, Transport Users and Transport Providers, including matching demands, refining trustability ratings, optimizing capacity and efficient throughput of the system.

Characteristics of the Shared Transport Marketplace Method a) providing an electronic registry of capacity containing a plurality of geographic locations, where one or more electronic devices in each of a plurality of transport vehicles registers the spare transport capacity and location information of the vehicles via wireless data communications to the registry of capacity, b) providing an electronic registry of demand, where the transport demand needs of a plurality of individuals or items is registered by a plurality of means to the registry of demand by the transport user, i. where such plurality of individuals or items can include registration via Internet web pages and Internet applications, via SMS messages, via e-mail, via IVR systems, via telephone operators, via applications or web pages running on handheld wireless devices such as location-aware phones, and the like ii. where such demand can be limited to a set of rules not just between start and destination locations and needed capacity of seats or space, but also include such limitations as requirements for the transport provider to be of a certain level of experience, gender, or membership in certain closed communities, or for the transport capacity to have certain conveniences or services, such as baby seats, wheelchair access.

(a) where such closed communities may include persons associated with a certain company, university, social group, or Internet social networking community, for example.

iii. where such demand can include destination locations that are specified by purpose of journey or type of destination, increasing the availability and timeliness of transport options to the transport user.

(a) where such type of destination could be specified to be any typical consumer or business category, such as supermarket, shopping mall, coffee shop, or a specific brand of these, (b) where such purpose of journey could be one or a combination of factors, such as to see a specific movie title, regardless of the cineplex where it was showing.

c) providing a central processing capability in each or in a plurality of geographies to provide one or more matches of the transport capacity with the transport demand, i. according to any specific limitations the demand may restrictively preset, and any predetermined trustability parameters set by the transport demand and the transport capacity.

(a) including trust parameters, such as the sex or experience of the transport provider or transport user (b) including demand requirements, such as the availability of a child seat or wheelchair access (c) including trust parameters restricting matches to those within a set of pre-approved transport providers or transport users from a given company (d) including trust parameters restricting matches to those with membership in a pre-defined social group, club, or Internet community.

(e) including trust parameters restricting matches to those with sufficiently high transport community ratings, 1. providing a self-correcting system to the community of transport capacity providers and transport users to continuously update transport provider and transport user ratings, d) providing a means of automated communication with the transport capacity to confirm the availability and willingness of the capacity to transport the demand; and likewise providing a means of automated communication with the transport demand to confirm the booking details of the capacity;

i. providing a means to direct the transport capacity to the geographic position of the transport demand(s), and automatically redirecting the transport capacity to the meeting point location of the transport demand if transport capacity needs to be re-routed,
ii. describing booking details to the transport demand of the transport capacity including such possibilities as, the time and location of the pickup along with identifying characteristics of the transport capacity and booking confirmation information.
   (a) where, depending on the timeliness reliability rating of the transport user, notice of the transport capacity must be confirmed at an earlier time than otherwise required.
e) providing a means of tracking the pick-up and delivery of the transport demand by the transport capacity
   i. automatically re-allocating and rescheduling a missed pick-up to other available transport capacity in the registry of transport
   ii. providing a registry of missed pick-ups which is updated whenever the Transport Provider fails to pick up the Transport User who was in position at the Transport Start, where the missed-pick-up registry is used as a factor in the rating system for the transport Provider.
   iii. providing a report of missed pick-up to a network operations center to provide for manual intervention if necessary.
   iv. providing a means of verifying and vetting the truth and authorization of the transport provider and the transport user
      (a) where such means of verification of the pick-up of the transport capacity by the transport provider can be accomplished by methods including
         1. entry of a PIN (personal identification number) provided by the transport user to the transport provider and entered on the in-vehicle system.
            1. where such PIN could be generated automatically and communicated to the transport user upon confirmation of the transport capacity via automated communications (SMS or e-mail or IVR) in the booking details.
         2. near-field communications between the in-vehicle system and the transport user's personal communications device (or other ID, including payment ID), verifying the transport demand's physical presence.
         3. automatic determination of continuous proximity between the transport capacity's geographic location with the transport demand's geographic location, by periodic confirmation by the central tracking system of the location of the in-vehicle device and the personal communication device.
         4. interaction, either through data or through verbal communication, between the network operations center and the transport provider and the transport user, using predetermined pass codes to confirm the identity and testimony of the transport provider and the transport user.
      2. providing the transport user's proof of delivery to the destination location by the registration of route positions and timing of the transport capacity via automatic communication between the in-vehicle device, by the confirmation of the transport provider and the transport user.
         1. where the confirmation of the transport provider and the transport user can be automatically provided by electronic devices, or by the co-ordinated proximity method, or by the breaking of near-field communications between the transport user and the transport provider, or by a services message receipt which remains uncontested at the destination location.

Characteristics of the Network Operations Center
   f) bringing service irregularities to the attention of operations personnel,
   g) alerting such personnel to events from missed pick-ups to occasions, such as a transport provider who is off-route from the destination location of the transport capacity ("errant vehicle").
   h) providing automated escalation of response, depending on safety and security preferences and needs, whereby potentially dangerous situations are rapidly escalated for manual intervention of operators at the network operations center or security or public safety personnel,
   i) providing an ability to continuously track the physical location of an errant vehicle and the transport capacity.
   j) providing the capability of booking services to those who don't use more automated means, with the network operations personnel booking the request, or answering requests for information, for the telephone caller.

Additional Secondary Registry of Transport Capacity
An additional secondary registry of transport capacity may be added to the system
   to allow transport capacity to see both the shared transport network data and network data of public and private transportation network operators,
   to show the transport user whichever network services best fits their demand
   to book transport capacity on the shared transport network or with public and private operators.
      i. providing similar notification and cashless transaction benefit to users of both public transport and shared transport.
         (a) where the public or private transport operator has an existing system with PIN authorization, or an integrated ticketing system compatible with the shared transport system, providing necessary authorization and PIN to the transport user.
         (b) where the public or private transport operator has no existing system for PIN authorization, providing the transport operator with the in-vehicle device, or a commercial version of the same.
      ii. enabling the benefit of reduced tax consequences for those governmental entities that allow pre-tax deductions or credits for transportation expenses as detailed.

The transport capacity can be registered automatically, by simple movement of the vehicle indicating the direction and destination of the transport capacity:
   where the destination of the vehicle is predetermined by a route or schedule pre-registered by the transport capacity;
   where the destination of the vehicle is determined by comparing its position and timing to predetermined schedules associated with that vehicle The usage of the system by transport providers and transport users can be tracked:
   providing a registry of service credits provided by transport providers and transport users, including,
      i. interchanging services with all other members of the network, providing documentation to eliminate taxable consequences where local laws permit,
      ii. reducing effective cost for the transport user where local laws permit by providing the transport user with an authorization system to credit the service credit system from their pre-tax income, either directed by the employer or by the employee, iii. providing a detail and registry of usage which qualifies transport providers and transport users with information means sufficient to satisfy governmental laws to qualify for any tax credits or means for preferential road allowances and privileges which may be enabled through legislation, (a) means for preferential road allowances shall include such preferential treatment such as access to HOV lanes, reduced or eliminated cost for such governmental programs as congestion charging, road usage charging, toll road access, parking and preferred-location parking.

(b) qualification for tax credits could include the computation of carbon benefits, vehicle registration taxes, annual road charges of using the invention over traditional means of transport.

(c) whereby information means to satisfy governmental authorization could include such means as real-time access to a central or proxy servers, 1. real-time access control including such things as barrier gate authorization at tolls, reduced charges for road usage when the vehicle contains more transport users or transport capacity, access to HOV lanes, or in parking lots.

iv. providing access control information for private or governmental users for parking or entry gates, (a) whereby the approval of the access to restricted, preferred parking, or reduced charges for such, could be determined via real-time or near-real time access to the central registry (or its proxy), or an on-board device authorized by the activity of the transport capacity.

The system for tracking the usage of system by transport providers and transport users may comprise measuring the volume of journeys between a plurality of locations, where the volume of spare transport capacity is continually monitored by wireless communications with the location-aware vehicles, storing this information in a stochastic data model, which can then predict available capacity and demand between any point in the covered geographic regions of the network by time of day, day of week, and day of year, providing transport users and transport providers with means to retrieve information about the likely availability of transport capacity and transport demand between any given start and destination locations, at a specific time of day or in general.

This latter system may also be provided with system means to retrieve information via real-time display on web pages, via SMS/e-mail, via IVR or operator-assisted verbal conveyance of this information. The information may be periodically sent to the transport user, or sent to the transport user when triggered by new services or higher quality options appearing in areas where the user has registered an interest or previously travelled using the system.

The system also provides for showing real-time, variable transport capacity on a display. To this end, the system:

provides a registry which is able to store and display a series of destinations and times from any given departure area, along with other specifics i. including public and private transport operations ii. including departure points within a departure area (that is, gates, bays, or geographically distinct pick-up points in densely populated areas, modal interchange points, and campuses).

iii. displaying major intermediate locations served by the individual routes shows the plurality of transport capacities passing the departure area i. where the display could be placed in the lobby of a corporate campus as a visual reminder as people leave work that there are other transport options available to them ii. where the display could be shown as a web page, a frame or portal within a web page, or as a component of a user's configurable home page, portal, or social networking community, iii. where the display could also be mounted as a conventional real-time passenger Information display at or near a conventional bus or public transport stop, with the added shared transport information displayed.

shows the real-time departure needs of registered Transport Demands, as a means of stimulating Transport Capacity market for more capacity.

calculates and displays a real-time network map of available transport in the shared transport network, where such map is a graphic representation (like a subway network of a city) of the available destinations reachable by the transport network.

The display of transport capacity may include the stochastic availability of transport capacity between locations, such as, for example, average availability of spare capacity every 5 minutes between 8 am and 9 am from Portarlington to Dublin.

The transport capacity has the ability to provide one or a plurality of ratings for the transport demand, after the demand has been satisfied. These ratings of the transport provider and transport user can be affected by issues, such as their proclivity to miss reserved meetings or not pay for their transport usage.

The transport capacity can visually signal its arrival at a meeting place by distinctive, externally visible indicators, e.g. one or a plurality of light emitting devices attached to the side of the vehicle's navigational system which faces in the direction of the driver's trajectory and/or the side of the navigational system which is in the direction of the face of the car, or attached to the rear side of the passenger's side sun visor of the car, or triggered by an in-vehicle system, but would use built-in external lights of the vehicle displaying in a set pattern to indicate pertinent information.

The externally visible indicator could also contain a particular message which would match with a code corresponding with the transport capacity's details. The message could be the name of a passenger or destination of the transport capacity or could contain a portion of a confidential Personal Identification Number that the transport capacity would have received in its confirmation message of the transport capacity.

Automatic verification of the delivery of transport services by independent confirmation of continuous co-ordinated proximity can be performed. For example, two different devices, one possessed by the transport provider, and the other by the transport user, with each having separately determined but accurate location and time information (for example, GPS phones) can be asserted to be verifiably in transit with each other through their continuous co-ordinated proximity. This assertion could be used as a verification of services provided or services used for the time and distance spent in transit, with related charges. This enables billing for the delivered service.

Further, two different devices can be used, one possessed by the transport provider, and the other by the transport user, with at least one having accurate location information, but both having a means to determine their continuous proximity to each other. One example of a means of determining continuous proximity would be the continuous presence of a near field wireless link (such as two devices with bluetooth or 802.11b).

Where both devices have live wireless data transmission capabilities to some central server, to provide independent confirmation of continuous proximity with link, reducing possibilities of fraud.

The invention thus provides a system that enables regular highway traffic and privately owned personal transport systems to augment and enable public mass transit networks.

The invention also provides a system that can match a rider's needs to move from one geographic point to another geographic point with an unrelated driver's unused transportation capacity.

The invention further provides an ad-hoc shared transport system for matching transport capacity with transport demand across a plurality of transport providers and a plurality of transport users.

What is claimed is:

1. A method of authenticating the use of a shared transport vehicle by a transport user device, the method comprising:
    periodically polling, by a verification system of an access control system, first location information of a transport provider device associated with the shared transport vehicle;
    periodically polling, by the verification system, second location information of a first transport user device, wherein the first transport user device is associated with a first shared transport user;
    detecting, by the verification system, an establishment of a near-field communication between the transport provider device and the transport user device;
    detecting, by the verification system, and based on (i) a comparison of the first location information and the second location information and (ii) the detection of the establishment of the near-field communication, that the first transport user device is in transit proximity to the transport provider device;
    storing, at a storage device of the verification system, a shared transport status for the shared transport vehicle in response to detecting the first transport user device in transit proximity to the transport provider device;
    comparing, by an access server of the verification system, the shared transport status of the shared transport vehicle against access control rules;
    determining, by the access server of the verification system, an access for the shared transport vehicle based on comparing the shared transport status against the access control rules; and
    sending, by the access server of the verification system, the access for the shared transport vehicle to a receiving entity.

2. The method of claim 1, wherein the receiving entity is a tolling system associated with a toll road, and wherein the tolling system applies discounted tolls based on the access.

3. The method of claim 1, wherein the receiving entity is a tolling system associated with a shared vehicle incentive program, and wherein the tolling system applies discounted fares based on the access.

4. The method of claim 1, wherein the receiving entity is a tolling system associated with a shared vehicle incentive program, and wherein the tolling system applies credits based on the access.

5. The method of claim 1, wherein the receiving entity is an access point associated with a high occupancy vehicle (HOV) lane.

6. The method of claim 1, wherein the receiving entity is an access point associated with a parking lot.

7. The method of claim 1, wherein the shared transport status is updated when the first transport user device is no longer in transit proximity to the transport provider device.

8. The method of claim 1, wherein a journey rate for the first shared transport user is determined based on the access.

9. The method of claim 1, wherein the storage device is a cache of the transport provider device.

10. A computer system for authenticating the use of a shared transport vehicle by a transport user device, the system comprising:
    a memory having processor-readable instructions stored therein; and
    a processor configured to access the memory and execute the processor-readable instructions, which when executed by the processor configures the processor to perform a plurality of functions, including functions to:
    periodically poll, by a verification system of an access control system, first location information of a transport provider device associated with the shared transport vehicle;
    periodically poll, by the verification system, second location information of a first transport user device, wherein the first transport user device is associated with a first shared transport user;
    detect, by the verification system, an establishment of a near-field communication between the transport provider device and the transport user device;
    detect, by the verification system, and based on (i) a comparison of the first location information and the second location information and (ii) the detection of the establishment of the near-field communication, that the first transport user device is in transit proximity to the transport provider device;
    store, at a storage device of the verification system, a shared transport status for the shared transport vehicle in response to detecting the first transport user device in transit proximity to the transport provider device;
    compare, by an access server of the verification system, the shared transport status of the shared transport vehicle against access control rules;
    determine, by the access server of the verification system, an access for the shared transport vehicle based on comparing the shared transport status against the access control rules; and
    send, by the access server of the verification system, the access for the shared transport vehicle to a receiving entity.

11. The computer system of claim 10, wherein the receiving entity is a tolling system associated with a toll road, and wherein the tolling system applies discounted tolls based on the access.

12. The computer system of claim 10, wherein the receiving entity is a tolling system associated with a shared vehicle incentive program, and wherein the tolling system applies discounted fares based on the access.

13. The computer system of claim 10, wherein the receiving entity is a tolling system associated with a shared vehicle incentive program, and wherein the tolling system applies credits based on the access.

14. The computer system of claim 10, wherein the receiving entity is an access point associated with at least one of a parking lot and a high occupancy vehicle (HOV) lane.

15. The computer system of claim 10, wherein the shared transport status is updated when the first transport user device is no longer in transit proximity to the transport provider device.

16. The computer system of claim 10, wherein a journey rate for the first shared transport user is determined based on the access.

* * * * *